US012574062B2

(12) United States Patent (10) Patent No.: US 12,574,062 B2
Aagiru et al. (45) Date of Patent: Mar. 10, 2026

(54) WIRELESS COMMUNICATION, MAINTAINING WIRELESS THROUGHPUT, AND DETECTION AND MANAGEMENT OF HUMAN BODY PROXIMITY TO TRANSMITTING ANTENNAS

(71) Applicant: Intel Corporation, Santa Clara, CA (US)

(72) Inventors: Vamshi Krishna Aagiru, Bangalore (IN); Santhosh Ap, Bangalore (IN); Praveen Kashyap Ananta Bhat, Bangalore (IN); Arjun C, Bangalore (IN); Shailendra Singh Chauhan, Bangalore (IN); Sajal Kumar Das, Bangalore (IN); Walid El Hajj, Antibes (FR); Isha Garg, Bangalore (IN); Sagar Gupta, Ghaziabad (IN); Mallari Hanchate, Bangalore (IN); Mythili Hegde, Bangalore (IN); Siva Prasad Jangili Ganga, Jambagh (IN); Satyajit Siddharay Kamat, Bangalore (IN); Noam Kogos, Ramat Hasharo (IL); Ronen Kronfeld, Shoham (IL); Adiel Langer, Petah Tiqwa (IL); Padmesh Murugan Latha, Bangalore (IN); Vishram Shriram Pandit, Bangalore (IN); Abhijith Prabha, Piravom (IN); Manisha Raiguru, Bangalore (IN); Ehud Reshef, Qiryat Tivon (IL); Amir Rubin, Kiryat Ono (IL); Shubham Kumar Sahu, Balasore (IN); Gurpreet Sandhu, Bangalore (IN); Michael Shachar, Kfar Glikson (IL); Harry Skinner, Beaverton, OR (US); Madhukiran Srinivasareddy, Bangalore (IN); Gokul Subramaniam, Bangalore (IN); Maruti Tamrakar, Chhattisgarh (IN); Jayprakash Thakur, Bangalore (IN); Vijaya Prasad Ummella, Bangalore (IN); Yagnesh Vinodrai Waghela, Bangalore (IN)

(73) Assignee: Intel Corporation, Santa Clara, CA (US)

(*) Notice: Subject to any disclaimer, the term of this patent is extended or adjusted under 35 U.S.C. 154(b) by 321 days.

(21) Appl. No.: 18/145,860

(22) Filed: Dec. 23, 2022

(65) Prior Publication Data

US 2024/0214022 A1 Jun. 27, 2024

(51) Int. Cl.
H04B 1/3827 (2015.01)
H04B 7/06 (2006.01)
H04W 52/36 (2009.01)

(52) U.S. Cl.
CPC ........ H04B 1/3838 (2013.01); H04W 52/365 (2013.01); H04B 2001/3844 (2013.01)

(58) Field of Classification Search
CPC .......... H04B 1/3838; H04B 2001/3844; H04B 7/0602; H04B 7/0608; H04W 52/365; H04W 52/367
See application file for complete search history.

(56) References Cited

U.S. PATENT DOCUMENTS 9,867,139 B1 * 1/2018 Khasgiwala ......... H04B 17/318
10,484,075 B1 * 11/2019 Maheshwari ......... H04W 24/02
(Continued)

*Primary Examiner* — Andrew Wendell
(74) *Attorney, Agent, or Firm* — Viering, Jentschura & Partner mbB

(57) ABSTRACT

Various principles and methods are described herein to improve wireless communication in a user computing device. Certain aspects of the disclosure describe management of wireless transmissions relative to various regulations related to a specific absorption rate. Other aspects of the disclosure relate to detection of user proximity to a transmitting antenna. Other aspects relate to alternative
(Continued)

strategies to improve wireless communication, such as selection of alternate antennas or baseband modems, or changes in device orientation.

24 Claims, 24 Drawing Sheets

(56)         References Cited

U.S. PATENT DOCUMENTS

| | | | | |
|---|---|---|---|---|
| 10,652,832 | B1 * | 5/2020 | Hegde | H04W 52/18 |
| 11,968,319 | B2 * | 4/2024 | Desai | H04M 1/026 |
| 2005/0143151 | A1 * | 6/2005 | Ito | H04B 7/0871 |
| | | | | 455/575.5 |
| 2013/0225250 | A1 * | 8/2013 | Tudosoiu | H01Q 21/28 |
| | | | | 455/575.7 |
| 2015/0162942 | A1 * | 6/2015 | Bolin | H04W 76/23 |
| | | | | 370/252 |
| 2016/0094250 | A1 * | 3/2016 | Mujtaba | H04B 1/0064 |
| | | | | 455/552.1 |
| 2016/0226740 | A1 * | 8/2016 | Van Oost | H04L 43/0894 |
| 2017/0126265 | A1 * | 5/2017 | Black | H04W 88/02 |
| 2017/0171046 | A1 * | 6/2017 | Flood | H04R 25/554 |
| 2017/0310002 | A1 * | 10/2017 | Files | H01Q 1/2266 |
| 2019/0335416 | A1 * | 10/2019 | Kumar | H04L 5/005 |
| 2020/0076488 | A1 * | 3/2020 | Brunel | H04B 7/0695 |
| 2020/0336222 | A1 * | 10/2020 | Rimini | H04B 1/04 |
| 2022/0201693 | A1 * | 6/2022 | Hwang | H04W 28/0268 |
| 2022/0360972 | A1 * | 11/2022 | Ross | H04W 4/80 |
| 2022/0407573 | A1 * | 12/2022 | Dou | H01Q 21/28 |
| 2023/0029175 | A1 * | 1/2023 | Cho | H01Q 21/06 |
| 2023/0243915 | A1 * | 8/2023 | Yerramalli | H04W 4/029 |
| | | | | 455/456.1 |
| 2024/0196343 | A1 * | 6/2024 | Das | H04W 52/42 |

* cited by examiner

Antenna

Warning message pop-up in screen

Antenna1

Antenna2

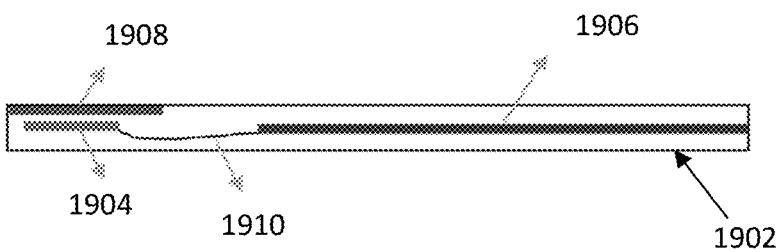
FIG. 19
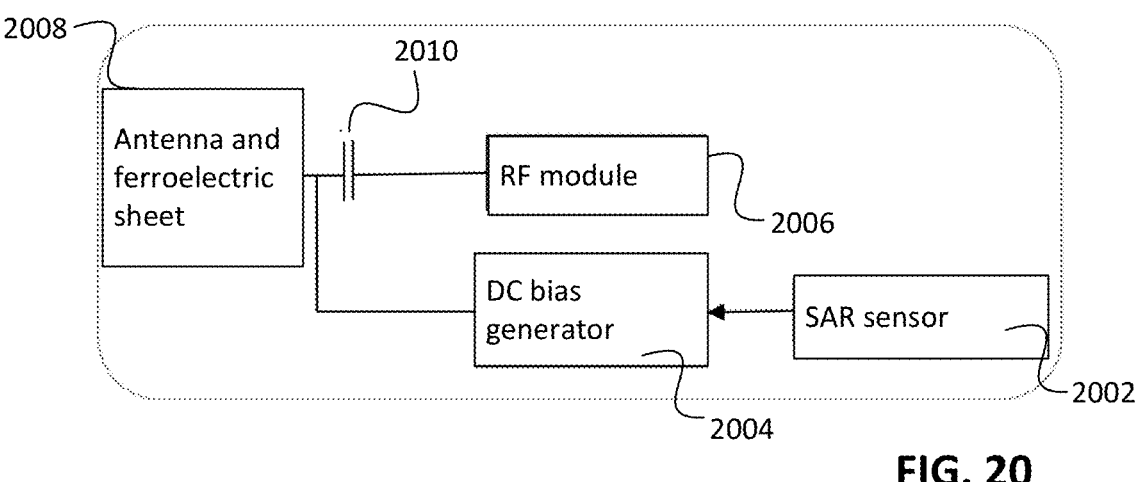
FIG. 20
| 2108 |
|---|
| 2106 |
| 2104 |
| 2102 |
FIG. 21

2702

2704

Proximity sensor 2708

Memory 2706

Processor 2710

Baseband modem 2712

Baseband modem 2714

Figure 28:
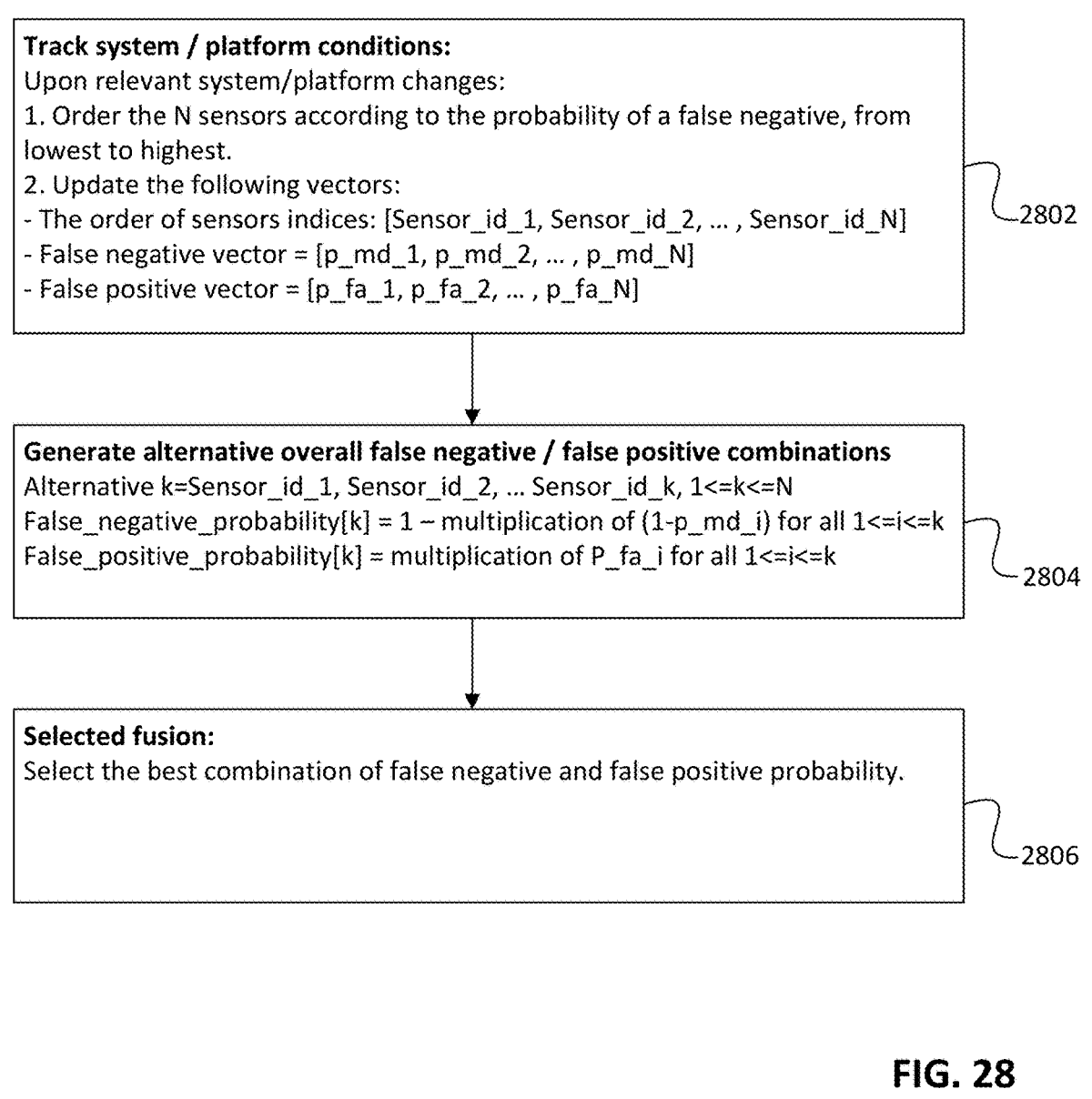

Track system / platform conditions:
Upon relevant system/platform changes:
1. Order the N sensors according to the probability of a false negative, from lowest to highest.
2. Update the following vectors:
- The order of sensors indices: [Sensor_id_1, Sensor_id_2, ... , Sensor_id_N]
- False negative vector = [p_md_1, p_md_2, ... , p_md_N]
- False positive vector = [p_fa_1, p_fa_2, ... , p_fa_N]

—2802

Generate alternative overall false negative / false positive combinations
Alternative k=Sensor_id_1, Sensor_id_2, ... Sensor_id_k, 1<=k<=N
False_negative_probability[k] = 1 – multiplication of (1-p_md_i) for all 1<=i<=k
False_positive_probability[k] = multiplication of P_fa_i for all 1<=i<=k

—2804

Selected fusion:
Select the best combination of false negative and false positive probability.

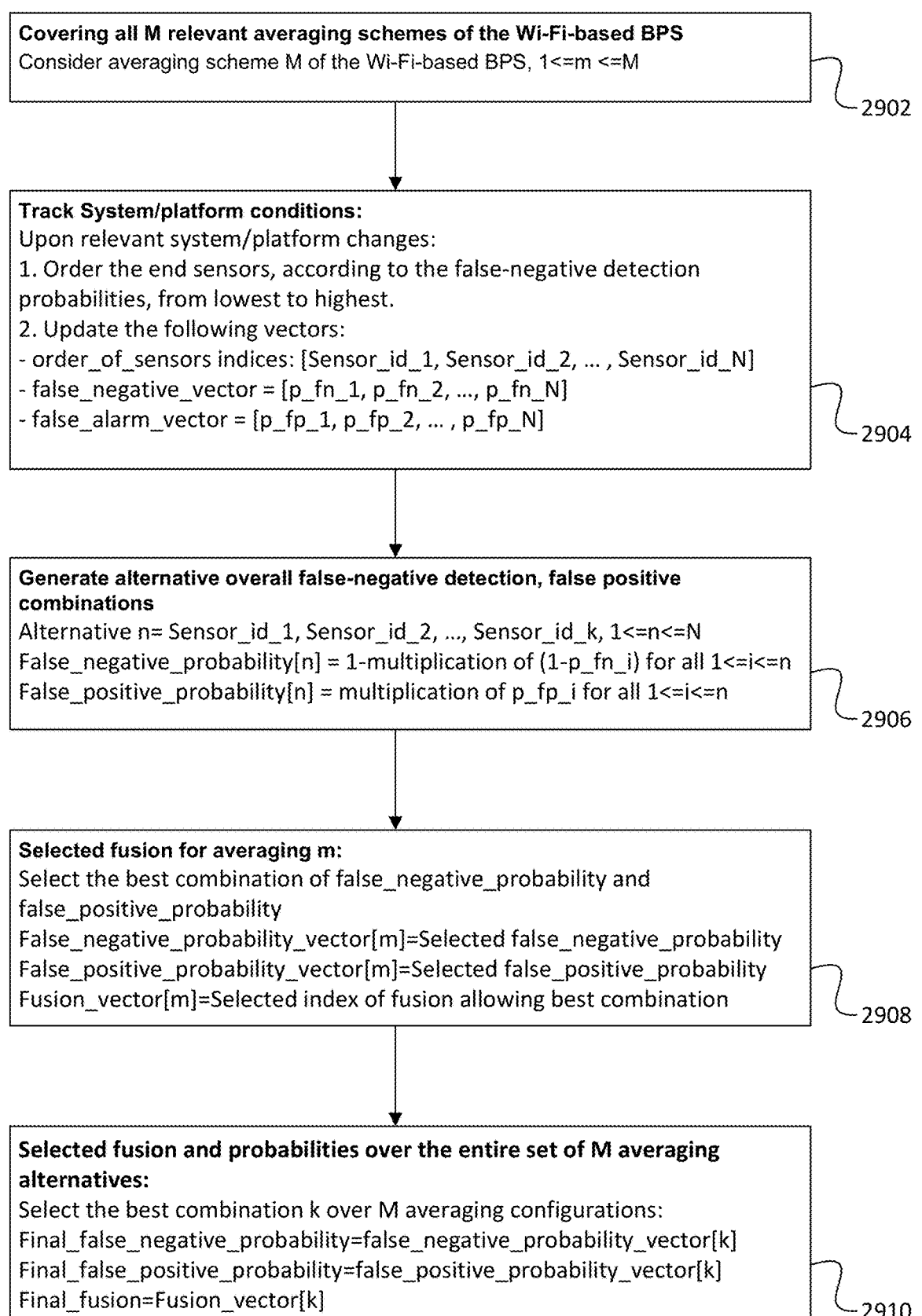

Covering all M relevant averaging schemes of the Wi-Fi-based BPS
Consider averaging scheme M of the Wi-Fi-based BPS, 1<=m <=M

2902

Track System/platform conditions:
Upon relevant system/platform changes:
1. Order the end sensors, according to the false-negative detection probabilities, from lowest to highest.
2. Update the following vectors:
- order_of_sensors indices: [Sensor_id_1, Sensor_id_2, ... , Sensor_id_N]
- false_negative_vector = [p_fn_1, p_fn_2, ..., p_fn_N]
- false_alarm_vector = [p_fp_1, p_fp_2, ... , p_fp_N]

2904

Generate alternative overall false-negative detection, false positive combinations
Alternative n= Sensor_id_1, Sensor_id_2, ..., Sensor_id_k, 1<=n<=N
False_negative_probability[n] = 1-multiplication of (1-p_fn_i) for all 1<=i<=n
False_positive_probability[n] = multiplication of p_fp_i for all 1<=i<=n

2906

Selected fusion for averaging m:
Select the best combination of false_negative_probability and false_positive_probability
False_negative_probability_vector[m]=Selected false_negative_probability
False_positive_probability_vector[m]=Selected false_positive_probability
Fusion_vector[m]=Selected index of fusion allowing best combination

2908

Selected fusion and probabilities over the entire set of M averaging alternatives:
Select the best combination k over M averaging configurations:
Final_false_negative_probability=false_negative_probability_vector[k]
Final_false_positive_probability=false_positive_probability_vector[k]
Final_fusion=Fusion_vector[k]

First sensor 3202

Second sensor 3204

3108

Processor 3206

3200

3302

3304

WIRELESS COMMUNICATION, MAINTAINING WIRELESS THROUGHPUT, AND DETECTION AND MANAGEMENT OF HUMAN BODY PROXIMITY TO TRANSMITTING ANTENNAS

TECHNICAL FIELD

Various aspects of this disclosure generally relate to wireless communication and strategies to maintain or improve throughput, detection of a human body part in close proximity to a transmitting antenna, and management of transmissions when a human body part is in close proximity to a transmitting antenna.

BACKGROUND

According to a first aspect of the disclosure, many computing devices (e.g. laptops, tablet computers, etc.) conventionally have one or more antennas placed at a side of the device (e.g. along a housing, next to a keyboard, etc.). This placement is beneficial, in that it helps to design a narrow bezel display and/or increases an active area of the display. This placement can, however, be disadvantageous because such antennas are placed at areas where a user's hand or other body part are likely to be. For example, an antenna can be blocked (e.g. partially or completely obscured) by a human hand during typing or by a human body, such as while the device is resting on a user's lap. Such blocking of the one or more antennas may cause wireless throughput reduction or result in no appreciable signal being sent and/or received by the respective antenna. Moreover, if a transmit antenna is within a certain proximity to a human body part, then the transmitter is subject to human safety compliance restrictions, which may generally be referred to as Specific Absorption Rate (SAR) regulations. Throughout this document SAR will be used to connote the exposure of a human body part to radiating energy from an antenna. A SAR regulation will be used to connote a legal limit for SAR exposure. Conventionally, if a SAR value exceeds a regulatory limit, then a transmitter power back-off is required, which causes low throughput or may even turn off the transmitter that limits the user experience.

According to a second aspect of the disclosure, products including wireless transmitters that may operate near human bodies are required to ensure that the overall rate at which energy is absorbed per unit mass by a human body when exposed to the transmitted radio frequency (RF) electromagnetic field is within a regulated limit (e.g., they must comply with SAR regulations). To comply with SAR regulations, laptops, smartphones, and other devices are required to limit their maximum Tx power when in a "SAR condition" (e.g., when a transmit antenna is within a certain proximity of a human body part).

The SAR condition may be detected either through a dedicated body proximity sensor (referred to herein as a "SAR sensor" or a "proximity sensor") near the transmitting antenna. These proximity sensors, however, increase cost and therefore may be omitted from a design. In such circumstances, for example, the platform may set the SAR state (e.g., whether a power back-off is required) based on the platform configuration (e.g., by defining that the platform may be in a SAR state when it is in "tablet mode", or in other lid-to-base platform configurations) and the antenna location(s). It is desired to identify one or more sensing devices that are an alternative or supplement to a proximity sensor (e.g. a capacitive proximity sensor, an inductive proximity sensor) to detect when the device is in a SAR state.

According to a third aspect of the disclosure, the placement of proximity sensors around antennas conventionally consumes significant available space within the device. As the number of transmit antennas increases, a non-negligible amount of space within a computing device will be dedicated to SAR sensors. Furthermore, the addition of such SAR sensors increases expense. It is desired to reduce the space and/or cost of adding SAR sensors to a computing device.

According to a fourth aspect of the disclosure, computing devices conventionally meet SAR regulations by reducing the transmit power for a SAR-affected antenna. It is desired to identify a device that enables compliance with SAR regulations for a SAR-affected antenna without the need to reduce transmit power.

According to a fifth aspect of the disclosure, computing devices conventionally meet SAR requirements by reducing transmit power. This impairs wireless communications, in particular in the wide area network context. It is desired to maintain most or all transmit power for the network (e.g., for a wireless wide area network, for a wireless local area network), while protecting a human body part in a vicinity of a transmit antenna from energy in excess of the applicable regulations.

According to a sixth aspect of the disclosure, a SAR event conventionally causes a reduction in antenna transmit power, and thus results in reduced throughput. Conventionally, devices then check for quality of service (e.g., bandwidth, latency, received signal strength indicator, quality of service indicators) by initiating a fresh network scan. Based on the results of this network scan, the device decides whether to switch between available antennas to improve throughput. This results in a latency, as a fresh network scan must conventionally be completed and new quality of service information must conventionally be obtained before a decision about switching antennas can be made. This latency can be a few milliseconds to a few seconds, based on the network conditions. It is desired to decide whether to perform an antenna switch without incurring this latency.

According to a seventh aspect of the disclosure, various steps may be taken to improve throughput during a SAR event. Computing devices (e.g. laptops, tablets, etc.) often support both Wi-Fi and WWAN connectivity. The Wi-Fi and WWAN antennas may be placed at different locations with nearby proximity sensors to detect a SAR event and control the transmit power accordingly. Usually, the SAR event is managed by a reduction of antenna transmit power, which results in a decreased throughput. With the decreased throughput, the current methods attempt to improve Quality of Service (QoS) (e.g. bandwidth, latency, received signal strength indicator (RSSI), etc.) with a fresh network scan, which may result in a decision to switch between available networks. This causes a latency, since a fresh network scan must be completed, and new QoS data should be obtained for a network switching decision. The latency can be in the order of few milliseconds to few seconds, based on network conditions.

To avoid risk of exceeding SAR regulatory constraints, the false alarm probability of body proximity sensors (BPS) (also referred to herein as proximity sensors), in some platforms, may lead to unjustified false proximity detections, and thus to reduction of transmission power. This unjustified reduction of transmission power may lead to noticeable and unnecessary loss in the wireless networking performance of the device.

Use of a BPS that relies on wireless technology signaling may negatively affect user experience, due to network disconnections during the sensing periods. To reduce the false alarm probability, the body proximity sensor may sense multiple times, which can lead to increased traffic latency and potentially to such periods of network disconnection that lead to degraded user experience.

The body proximity flow senses body proximity based on changes in some parameter as compared to its value in condition that is reliably known as without body proximity. Without online ability to reliably identify such a condition, the system needs to rely on data captured during testing. This leads to extra time to the duration of the production of each unit and with that to increased costs and complexities in production and in system flows.

Many computing devices use multiple input multiple output (MIMO) technology, which consists of multiple wireless streams that are simultaneously or concurrently transmitted between antennas. In computing devices, antenna design has physical constraints that affect the radiofrequency networking performance for different device orientations. Users typically have no indication of constraints or suboptimal conditions resulting from orientation issues, and they may suffer from poor wireless performance if the computing device is not at its best orientation. For example, a user may choose to close the user's laptop lid while working in docking station mode, which may significantly impact wireless transmission and reception rates. These orientation based problems may be improved by changes to the device's orientation.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

4

Figure 13:
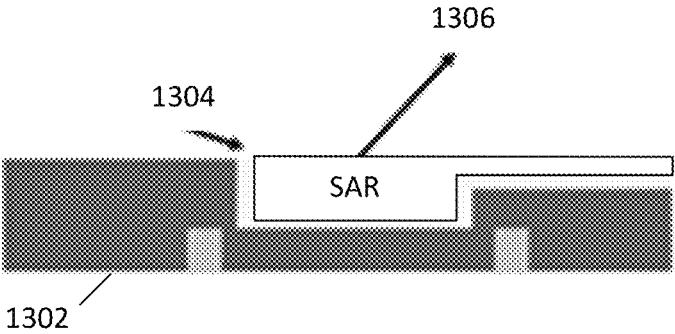
Figure 14:
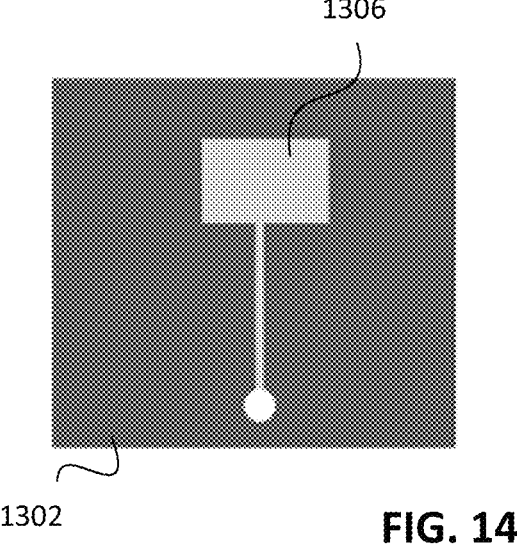
Figures 15, 16:
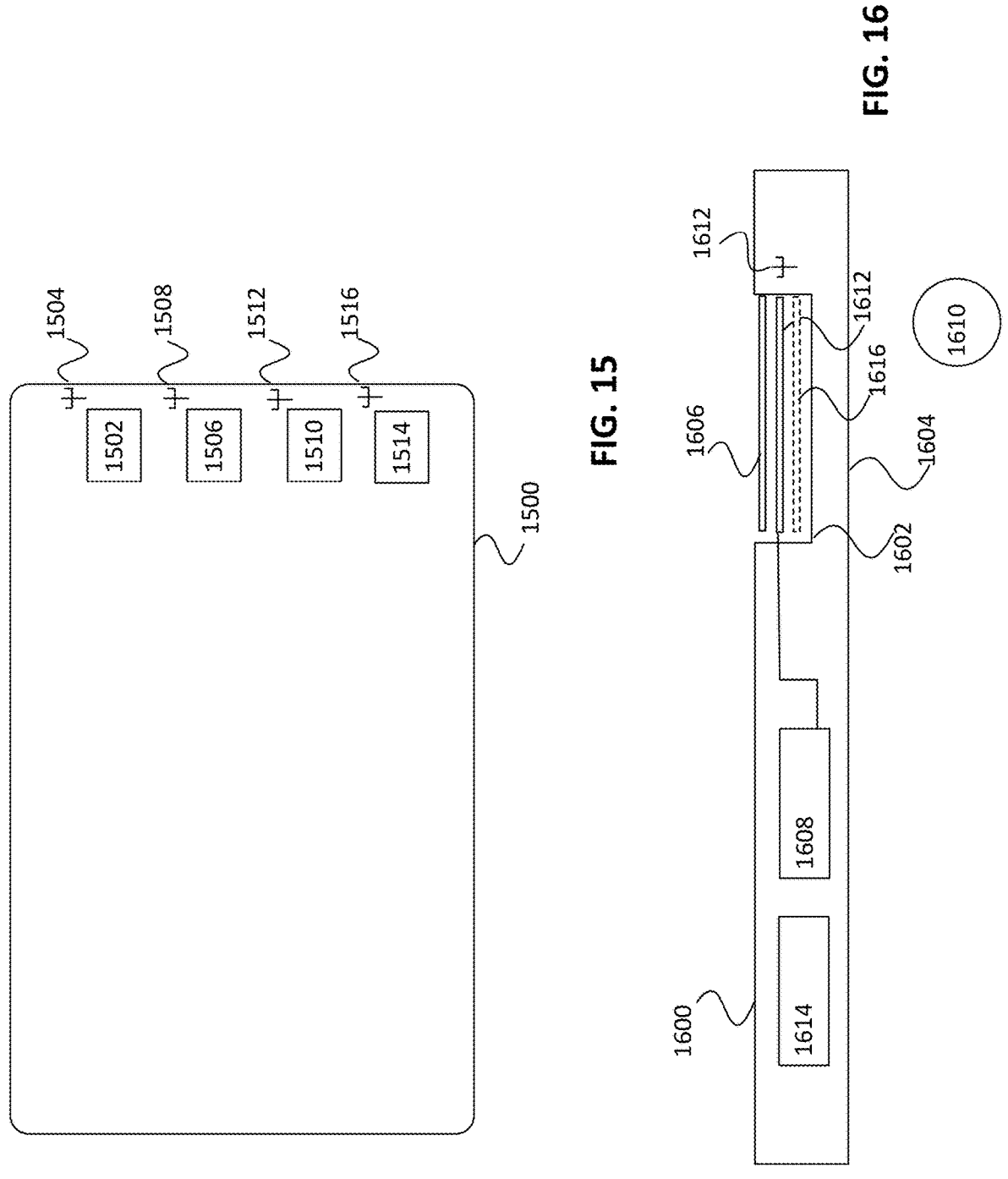
Figure 17:
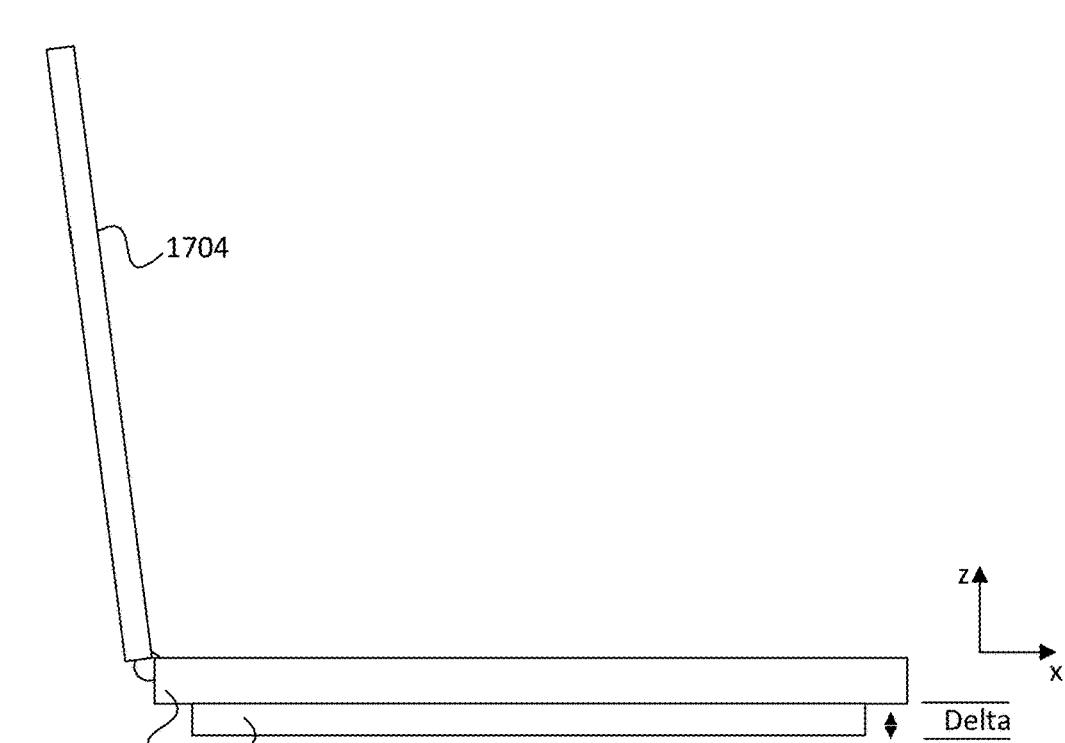
Figure 18A:
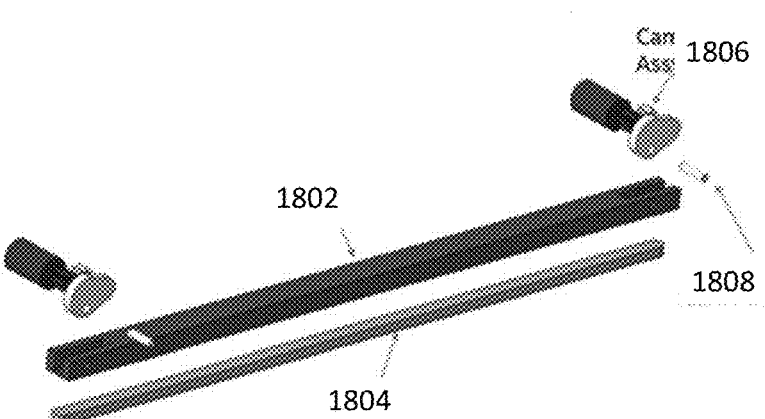
Figure 18B:
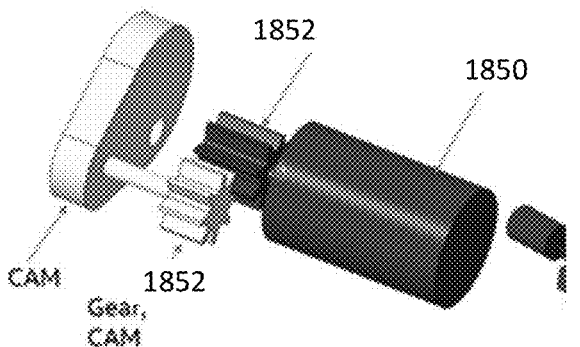
Figure 22A:
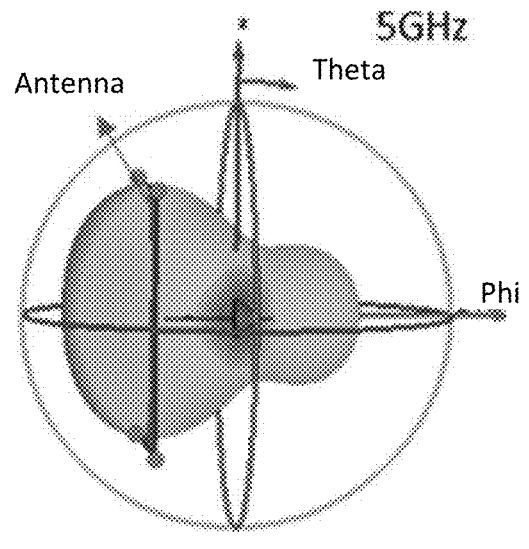
Figure 22B:
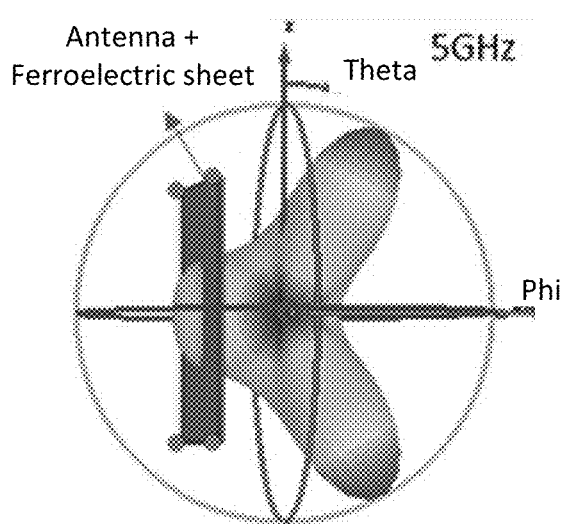
Figure 23:
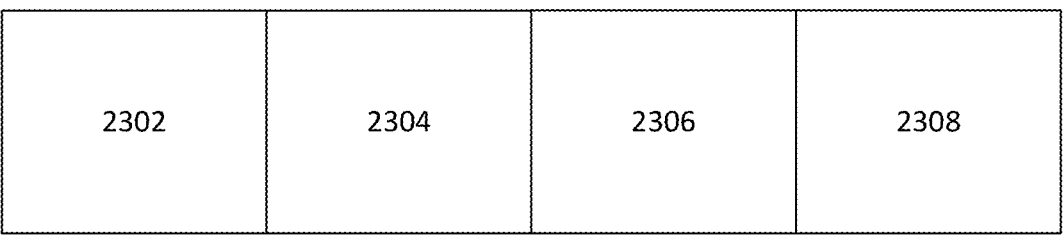
Figure 24:
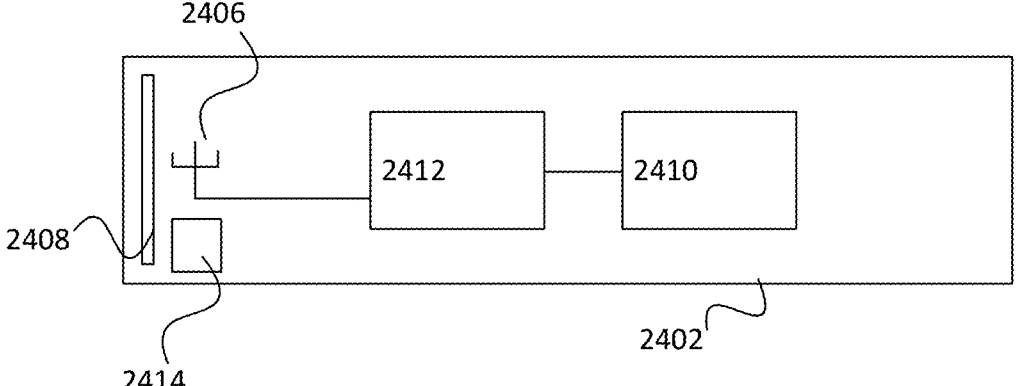
Figures 25A, 25B:
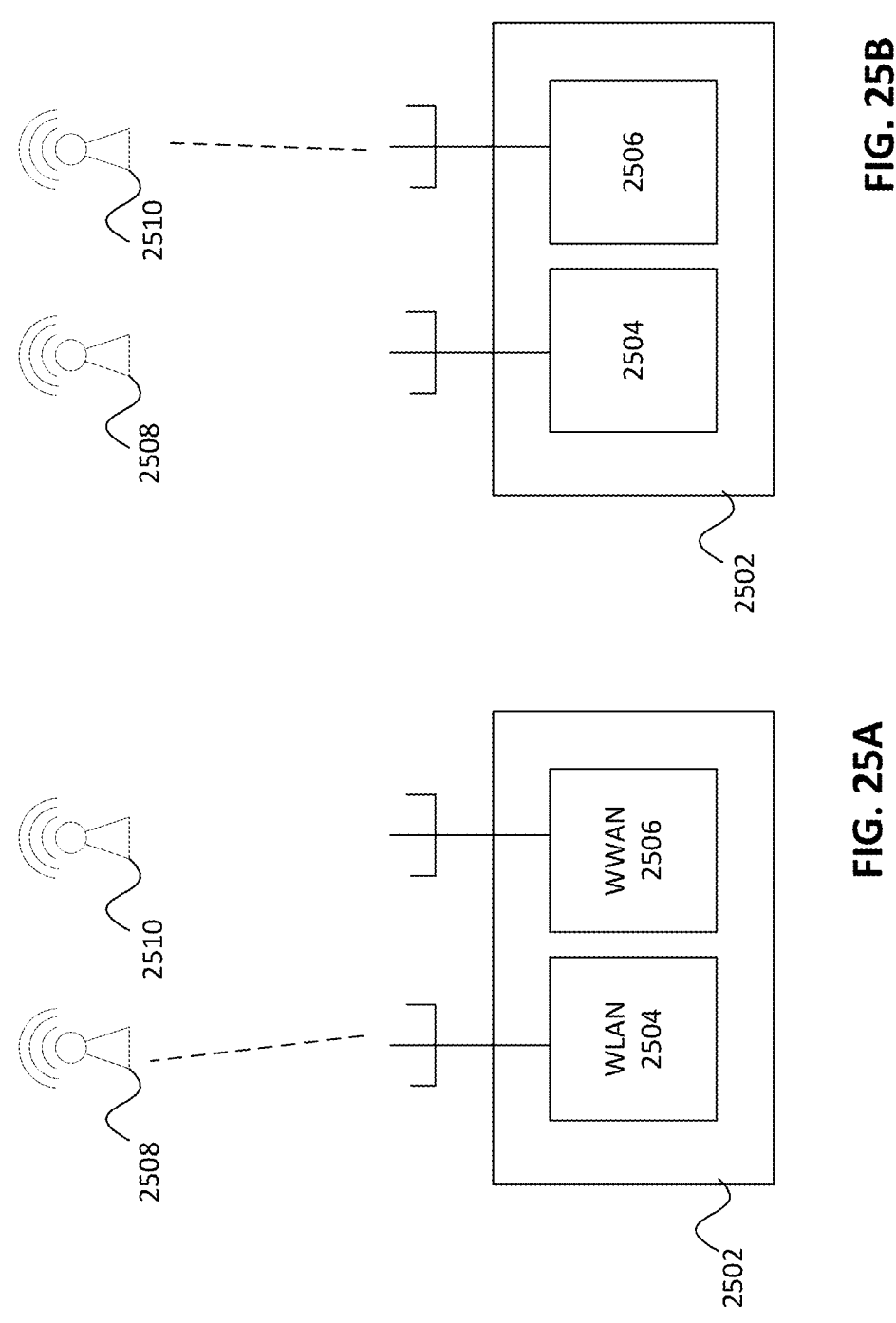
Figure 26:
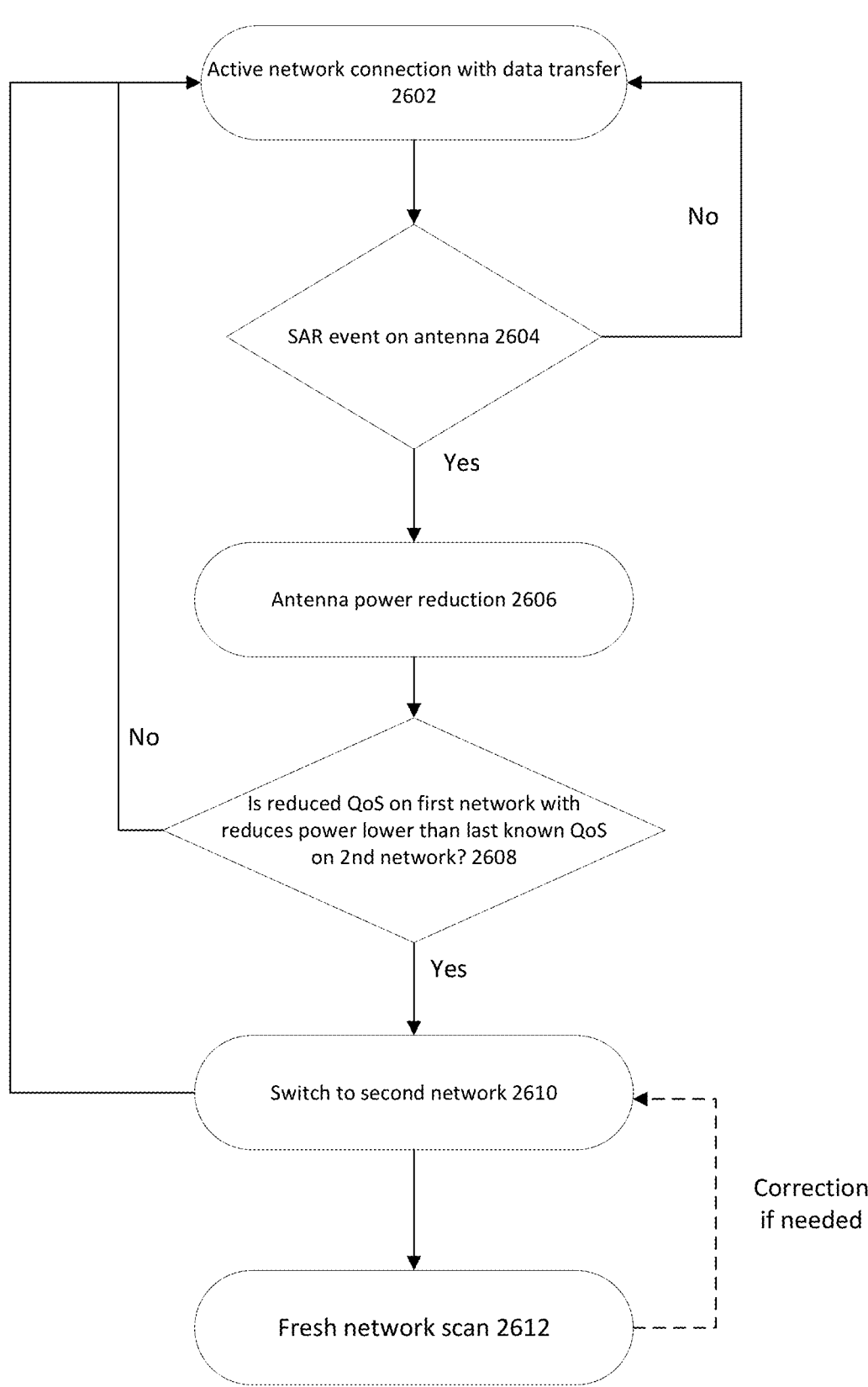
Figure 27:
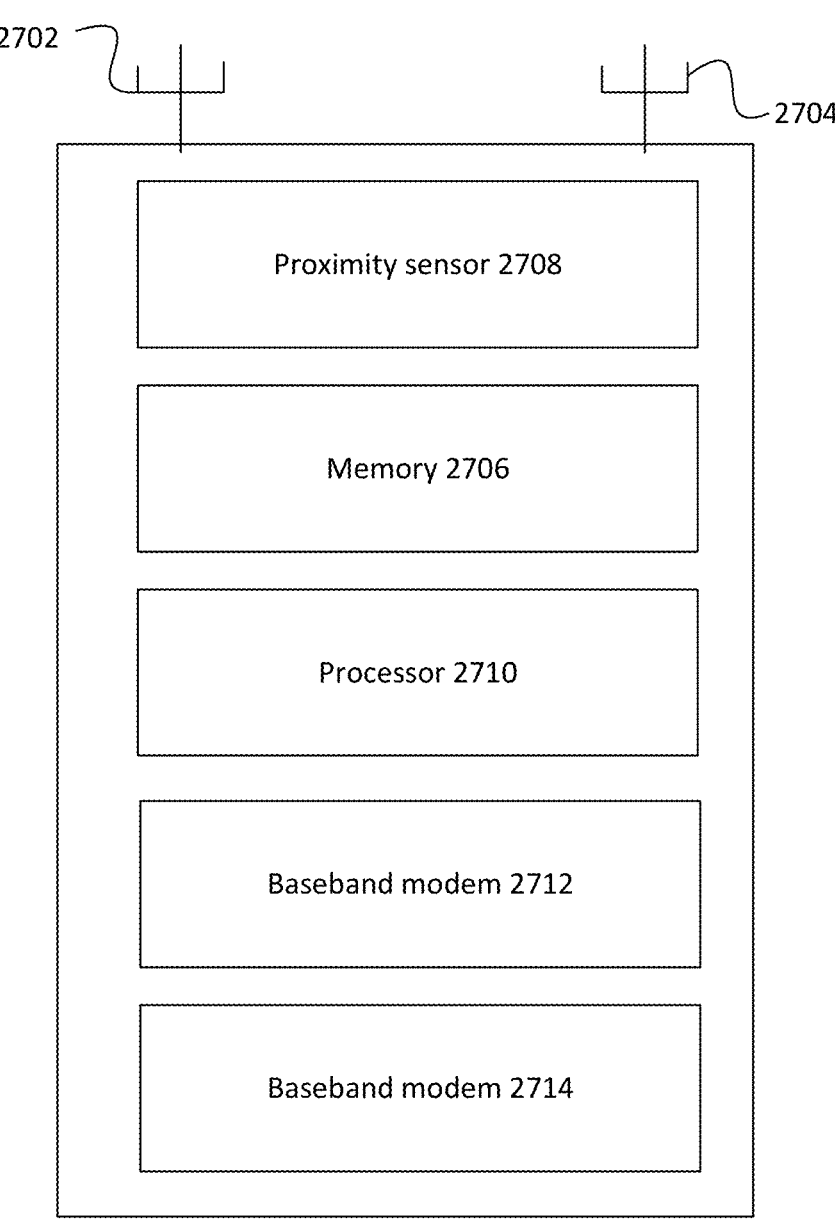
Figure 30:
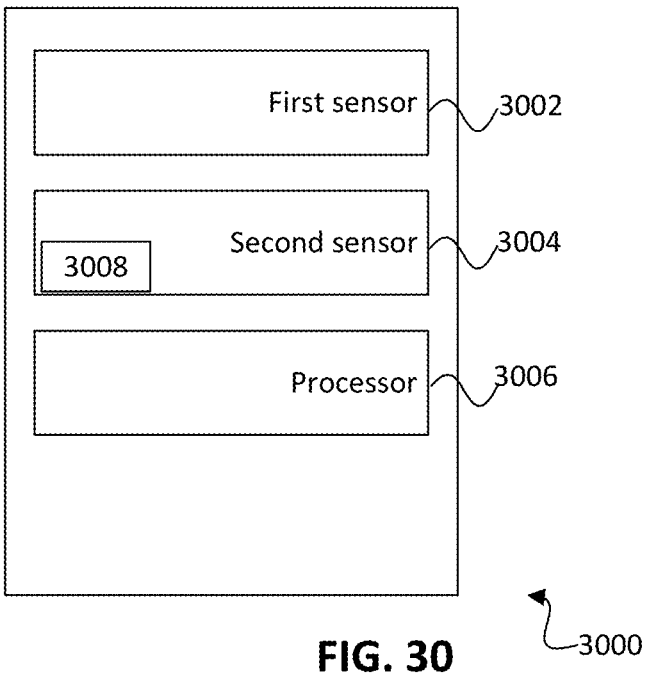
Figure 31:
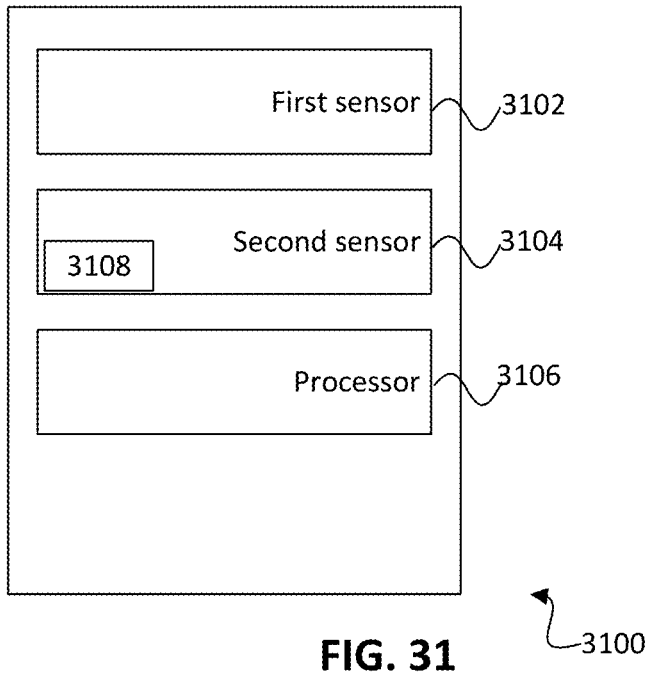
Figure 32:
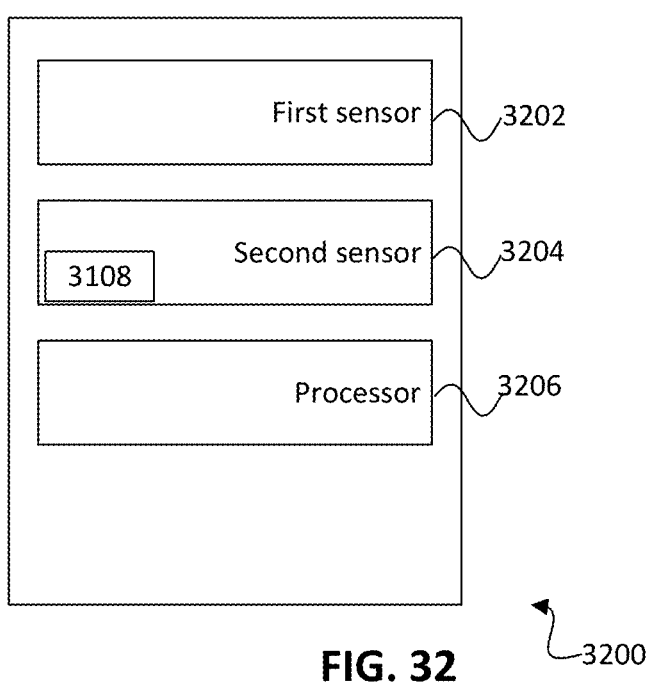
Figure 33:

FIG. 13 depicts a proximity sensor according to the third aspect of the disclosure;

FIG. 14 depicts a deposited metal layer forming a proximity sensor in an alternative view;

FIG. 15 depicts a computing device configured with multiple chassis-etched proximity sensors in close proximity to a corresponding antenna;

FIG. 16 depicts a computing device;

FIG. 17 depicts another configuration of the computing device;

FIG. 18A depicts an optional configuration of a device for moving the base in relation to the chassis;

FIG. 18B a close-up version of the cam assembly;

FIG. 19 depicts a computing device including a damper;

FIG. 20 depicts a configuration for applying a bias voltage to the ferroelectric sheet;

FIG. 21 depicts a ferroelectric sheet;

FIG. 22A depicts an emission pattern of a conventional omnidirectional antenna without the inclusion of the ferroelectric sheet;

FIG. 22B depicts an emission pattern of the conventional omnidirectional antenna with the addition of the ferroelectric sheet;

FIG. 23 depicts a sheet of graded dielectric material;

FIG. 24 depicts a computing device;

FIG. 25A depicts a first instance prior to a SAR event;

FIG. 25B depicts a switching operation;

FIG. 26 depicts the network switching operation;

FIG. 27 depicts a computing device;

FIG. 28 depicts procedure for sensor fusion;

FIG. 29 depicts a process flow for selection of an averaging and fusion scheme;

FIG. 30 depicts a computing device;

FIG. 31 depicts an additional computing device;

FIG. 32 depicts an additional computing device;

FIG. 33 depicts a wireless access point; and

Figure 34:
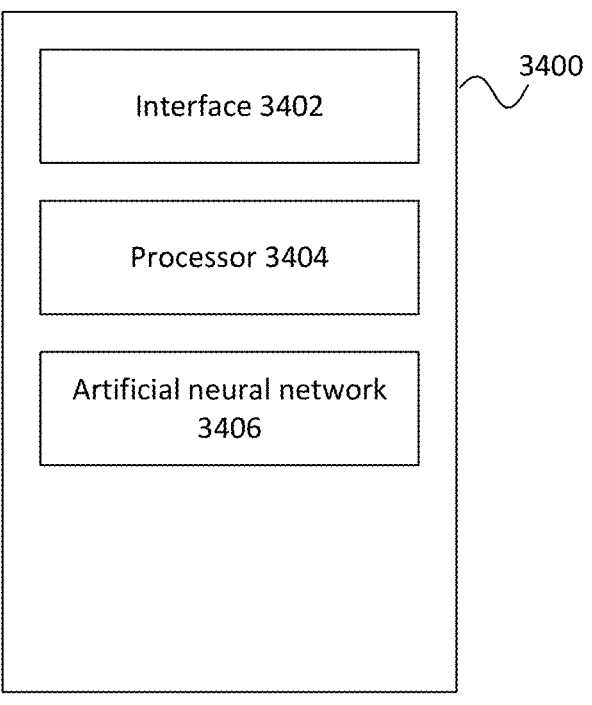

FIG. 34 depicts a computing device.

DESCRIPTION

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one.

Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Throughout this disclosure, reference is made to one or more processors that perform various actions based on proximity sensor data. In some configurations, these actions may be performed by a SAR controller, which may be a circuit configured to perform actions for compliance with SAR regulations. In performing these actions, the SAR controller may perform the actions itself, or in other cases, the SAR controller may instruction one or more other controllers or processors to perform the actions. For example, the SAR controller may instruct a processor in a baseband modem to transmit data at a certain transmit power. In other exemplary configurations, the actions described herein may be perform by the radiofrequency transmission processors (e.g., one or more processors in the baseband modem, one or more processors in the transceiver, etc.). In other exemplary configuration, the actions described herein may be performed by one or more application processors.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

When computing devices wirelessly transmit radiofrequency signals, energy in the form of electromagnetic waves is emitted from the corresponding one or more transmitting antennas. Although most people are constantly surrounded by at least some amount of energy from radiofrequency transmissions, such energy may be especially concentrated very close to the transmitting antenna (e.g. within a few centimeters from the antenna, within a few millimeters from the transmitting antenna, within a millimeter of the transmitting antenna). This energy may be absorbed by a human body part in close proximity to the antenna. The absorption of energy is increasingly a concern with the rise in the number of antenna per device, and also with the increasing use of higher-energy wavelengths (e.g. shorter wavelengths/higher frequencies, millimeter wavelengths, etc.). The absorption of such energy may be defined by a Specific Absorption Rate (SAR), which may be described as the power absorbed by mass of tissue and is thus often referred to in Watts per kilogram (W/kg). Various jurisdictions have imposed regulations to limit the SAR exposure. These regulations represent upper boundaries for SAR exposure, with which manufacturers must comply. The principles and methods disclosed herein are not specific to any particular jurisdiction or its particular Watt/kilogram maximum, nor to the particulars of how such SAR limit is to be measured in a given jurisdiction. Instead, the principles and methods disclosed herein may be applied to comply with SAR regulations in any jurisdiction.

Generally, however, there are conventionally two methods to address the SAR regulatory requirements. A first method is to use physical proximity detection (e.g. a proximity sensor) and corresponding circuit (e.g. an integrated circuit, a sensor on chip (SOC), a processor, etc.) to detect a user's body part in close proximity to an antenna and to take various steps to reduce the transmit power accordingly. A second method is to perform time averaging SAR (TA-SAR), which assumes less than maximum transmit power and/or less than constant transmission. In TAS, the transmission power is averaged (e.g. over a rolling window), and this average must fall beneath a regulatory threshold.

Whatever the method of calculation, user devices are required to comply with the applicable SAR regulations for the given jurisdiction. Practically speaking, this often means that the devices must identify when a human body part is within close proximity to a transmit antenna (after a few centimeters, the energy absorption diminishes significantly) and must take steps to limit the transmit power of the affected antenna so as to ensure that regulatory requirements are satisfied. Ideally, this is also performed in such a manner that link quality is unaffected or is impaired as little as possible.

According to the first aspect of the disclosure, when holding a computing device (e.g., in particular a handheld device, a tablet computer, a laptop computer, etc.), one or more antennas may be partially or completely obstructed by a user's body part. This partial or complete obstruction may result in decreased antenna throughput arising from corresponding poor antenna performance and/or transmit power reduction to comply with applicable SAR regulations. A device and method are disclosed herein that limit the unwanted effects of such a partial or complete antenna obstruction by generating a user alert to remove user's body part from a vicinity of the antenna.

A computing device may be configured with one or more proximity sensors, which may be configured to detect a proximity of a human body part in a vicinity of the device. Because the composition and functional principles of a proximity sensor are generally beyond the scope of this disclosure, a detailed recitation of the elements and functions of a proximity sensor will not be included at this juncture. It will suffice to include that the term proximity sensor, as used herein, is generally understood to mean a device that is able to contactlessly detect a human body part in a vicinity of the sensor. Such proximity sensors may be, for example, capacitive proximity sensors that are configured to generate an electrical field and the presence of objects within the electrical field can be detected based on measured changes in the corresponding capacitance. Alternatively or additionally, proximity sensors may be or include induction sensors, in which a magnetic field is generated by an inductor, and the presence of objects within a vicinity of the sensor can be detected based on changes in the magnetic field resulting from eddy currents. Although these may be the primary forms of proximity sensors, other devices may measure or detect a state that is indirectly associated with a presence of a human body part in a vicinity of the device, and these sensors may also function as proximity sensors for the purposes of this disclosure. This may include, for example, one or more accelerometers, which may be able to distinguish, based on sensing of movement, whether a device is resting on a table or on a user's lap. Alternatively or additionally, the proximity sensor may include an antenna and/or a baseband modem, which may be configured to detect a proximity of a human body part based on radiofrequency signals reflects from the body part and received at the antenna. Alternatively or additionally, certain image sensors may be used as a proximity sensor, as the image sensors (or the image sensors coupled with one or more processors for image processing) may detect the presence of a human body part within an image and may use one or more landmarks to detect a distance between the human body part and an antenna. Unless otherwise stated, any reference to a proximity sensor or a BPS herein may refer to any of the above sensor types, or to any sensor that is capable of detecting a human body part within close proximity to an antenna.

Figure 1:
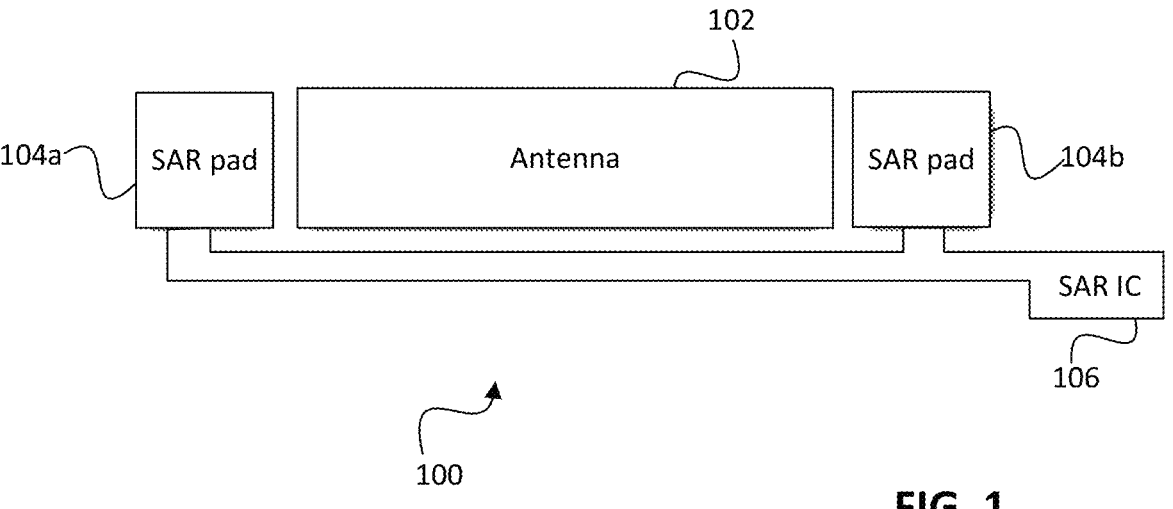
FIG. 1 depicts a conventional proximity sensor.

FIG. 1 depicts a conventional, capacitive proximity sensor 100, for demonstrative purposes. The proximity sensor 100 is located in close relationship to an antenna 102. The proximity sensor includes one or more sensor pads (e.g., referred to as "SAR pads" in the figure, also capacitive pads), depicted as 104a and 104b. Each sensor pad is connected to a controller or integrated circuit 106, which may be configured to detect a nearby object. Because the sensor pads are located in close relationship to the antenna 102, detection of an object (e.g. a human body part) within close proximity to the sensor pads also detects the object being in close proximity to the antenna 102.

Returning to the first aspect of the disclosure, a proximity sensor may detect the presence of a human body part near an antenna. When the proximity sensor detects the human body part within a specific proximity of the sensor, the device may trigger a transmission power back off, which may be necessary to comply with certain SAR regulations.

This is a growing problem, since many devices have antennas along the sides of the device, such as in the keyboard area, or otherwise in places in which the user is likely to place the user's hands or arms. Moreover, the user may rest the device on the user's lap or other parts of the user's body, thereby placing the body in close proximity to antennas located close to the device's housing.

Figure 2B:
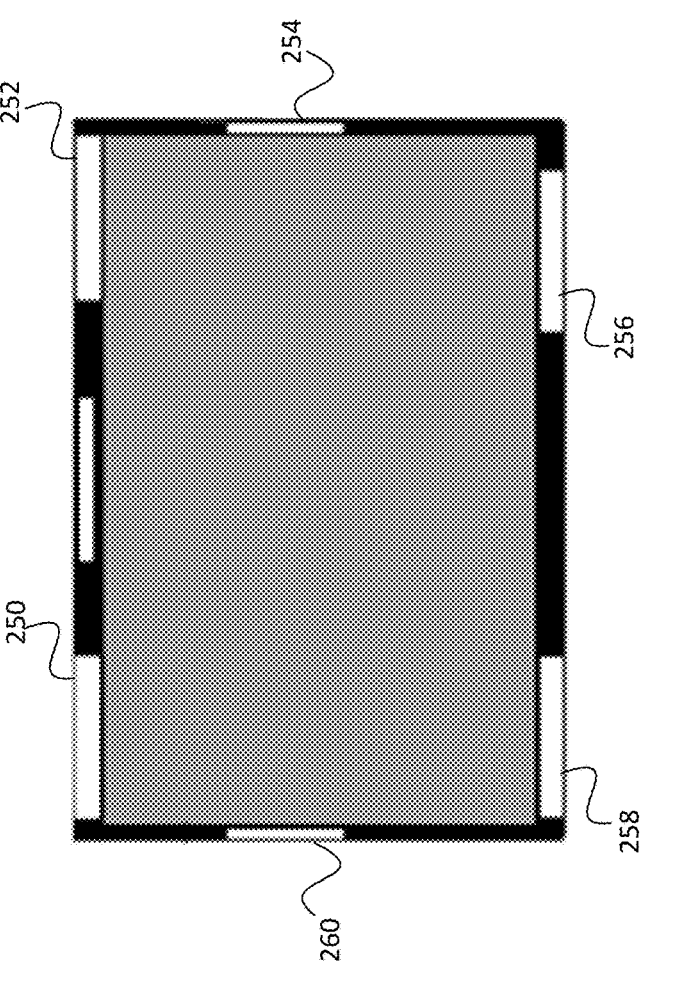
FIG. 2B depicts an alternative, conventional design of a laptop or tablet screen.
Figure 2A:
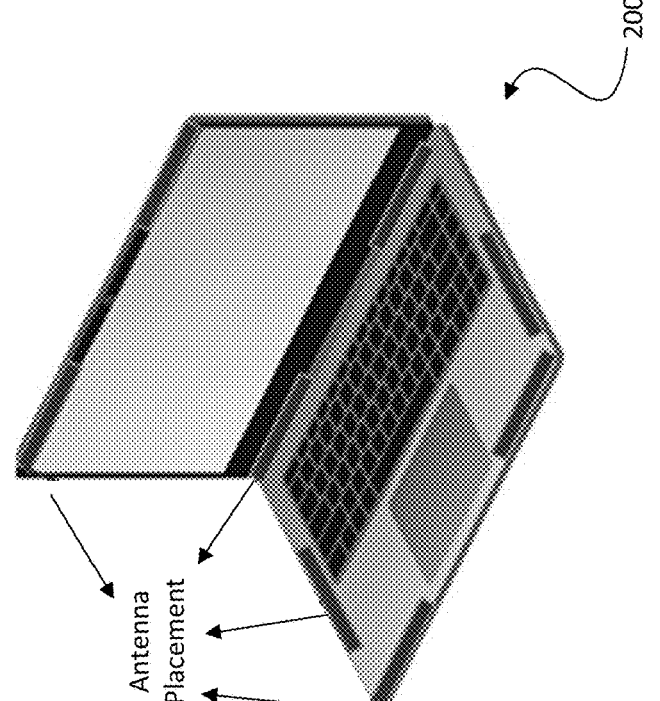
FIG. 2A depicts a conventional laptop design.
Figure 3:
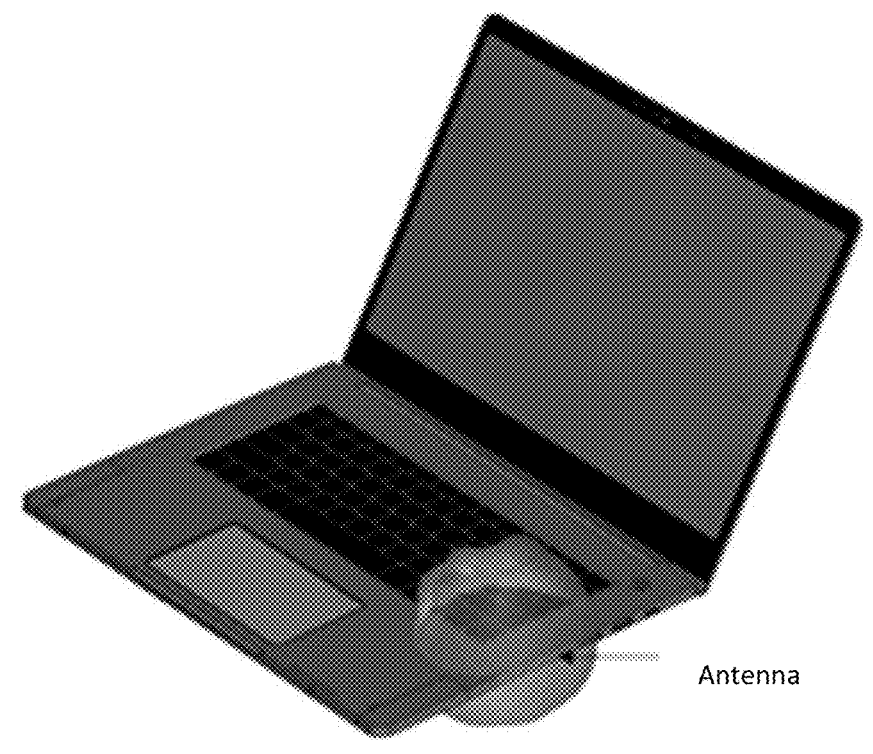
FIG. 3 depicts a radiation pattern from an antenna mounted on a laptop base.

FIG. 2A depicts a conventional laptop design 200 with antenna placement along the outer edges of the base and the screen. FIG. 2B depicts an alternative, conventional design of a laptop or tablet screen, having six antennas built within the outer edges of the screen, labeled as 250, 252, 254, 256, 258, and 260. Any of these antennas, or any combination of these antennas, may be selected any time for transmission of a wireless, radiofrequency signal. During transmission, each antenna emits radiofrequency energy in a radiation pattern. Many conventional antennas are known as omnidirectional antennas and which are configured to at least approximate a radiation pattern emanating from all directions of the antenna. FIG. 3 depicts a radiation pattern from an antenna mounted on the right edge of a laptop base. A human body part located within the area depicted as a radiation pattern within FIG. 3 will absorb some of the radiated energy, and therefore the device will be subject to the relevant SAR restrictions.

Of particular note, and as is evident from at least the devices in FIGS. 2A and 2B, the locations of a device's antennas are not typically marked, and therefore a user cannot reasonably ascertain whether the user's hands or other body parts are in close proximity to the antenna. A user may experience a decreased throughput due to a SAR event, and thus a decreased user experience, but it is still a significant leap for an average user to conclude that the throughput loss has resulted from hand placement. To counteract this, and to educate the consumer, computing devices may be configured to provide a user alert message when the user's hands or other body parts are in close proximity to an antenna. The user alert may be configured as a visual alert, an auditory alert, a haptic alert, or any of these.

Figure 4:
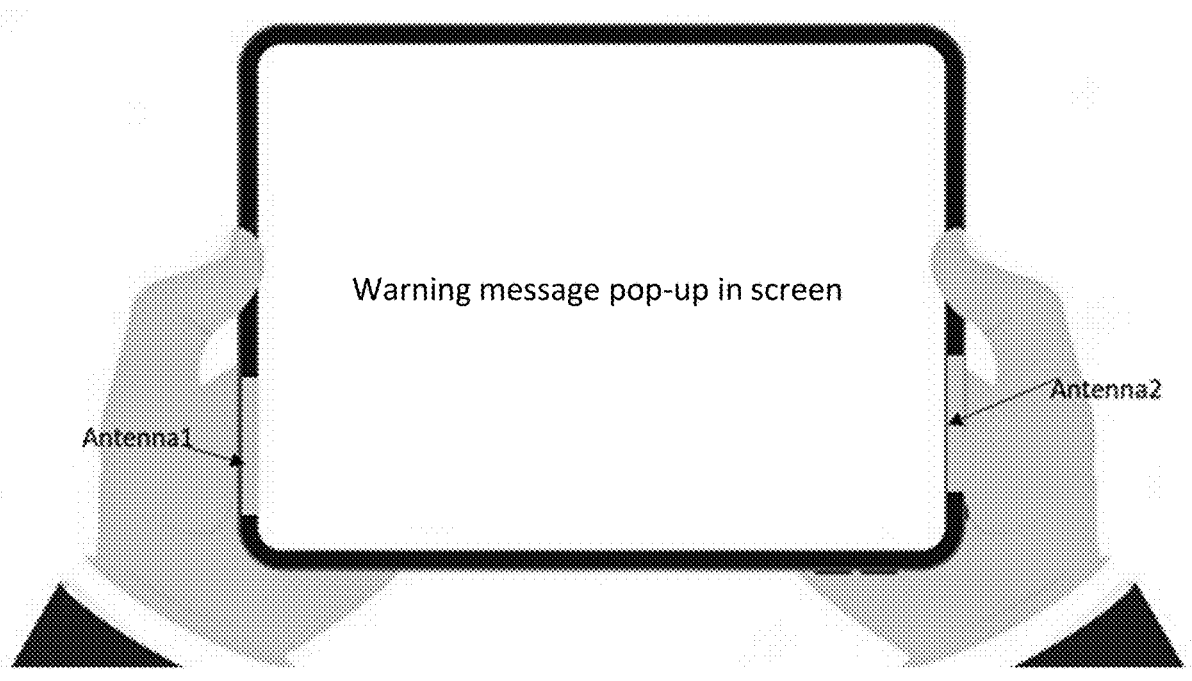
FIG. 4 depicts a visual or text-based user alert.

FIG. 4 depicts a visual or text-based user alert upon detection that a user's body part (e.g. hands, or fingers) is in close proximity to an antenna. If the user alert is configured as a text message, the user alert may include any text notification, without restriction, advising the user that the user's body part is near an antenna and/or identifying the location of the antenna. Alternatively or additionally, the user alert may include a visual alert in the form of an image, such as an icon, a warning symbol, an indicator of the placement of the antenna, or otherwise. Alternatively or additionally, the user alert may include an audible alert, such as a beep, tone, alarm, or other audible alert to indicate to the user that the user's body part is in close proximity to an antenna. Alternatively or additionally, the user alert may include a haptic alert, such as a vibration, shaking, buzzing, or other alert that may be perceived using a tactile sense. Any of these methods of alerts may be combined with any other methods of alerts.

A user receiving such a user alert may then choose to move the user's hand away from the antenna to achieve improved throughput and connectivity, or the user may disregard the user alert and continue to maintain the user's hand or body part in its current location. That is, the addition of a user alert does not, in and of itself, change the transmission power or settings, nor does the alert require the user to make any particular accommodations. Rather, the user may receive the alert as additional information and an educational message, and the user may proceed however the user wishes with respect to the location of the user's hands or body part.

In a first configuration, a computing device may generate a user alert as described herein based on proximity sensor data. That is, the device may include a proximity sensor, which may be configured to generate proximity sensor data, representing a proximity of a user's hand or body part to the sensor or antenna. When the proximity sensor data are outside of a range, the device may generate the user alert as described herein. When the proximity sensor data are within the range, the device may understand that a user's hand or body parts are not within close proximity to the sensor, and may not generate the user alert. Generally, these proximity sensors are placed in close proximity to an antenna, such that a close proximity to the proximity sensor represents a close proximity to the antenna.

In some circumstances, however, it may be impossible or undesirable to rely on a proximity sensor (e.g., a capacitive proximity sensor, an inductive proximity sensor) to detect the presence of a human body part for SAR compliance. For example, such sensors may include the materials costs of the underlying device, may complicate assembly, may interfere with other sensors, or otherwise be suboptimal. As an alternative, it may be possible to select a signal quality to serve as a proxy for human body part proximity. For example, a sudden, otherwise unexplained reduction in received signal strength may indicate the presence of a human body part in close proximity to the antenna, since the human body part would partially shield the antenna and thus result in diminished received signal strength.

To that end, whether alternatively or additionally to the above information related to the first configuration, and, according to a second configuration, the computing device may detect the close proximity of a user' hand or body part based on a received signal characteristic. The received signal characteristic may be any signal characteristic, but may include, for example, a received signal strength indicator (RSSI). In a typical wireless network protocol, the user device will repeatedly and frequently measure the received signal strength. The receive signal strength may fluctuate somewhat but is generally expected to remain relatively constant, when other variables, such as movement are excluded. Thus, a sudden decrease in a receive signal strength may be understood as a proxy for an antenna obstruction, such as a user's hand or body part. In this manner, the computing device may generate the user alert when the RSSI suddenly degrades. The RSSI is routinely measured by the corresponding baseband modem, and thus is a value that can be readily available to the SAR circuitry. A decaying RSSI may be a proxy for a user's body part coming in close proximity to an antenna, since the body part will obstruct or obscure the antenna's reception.

Figure 5:
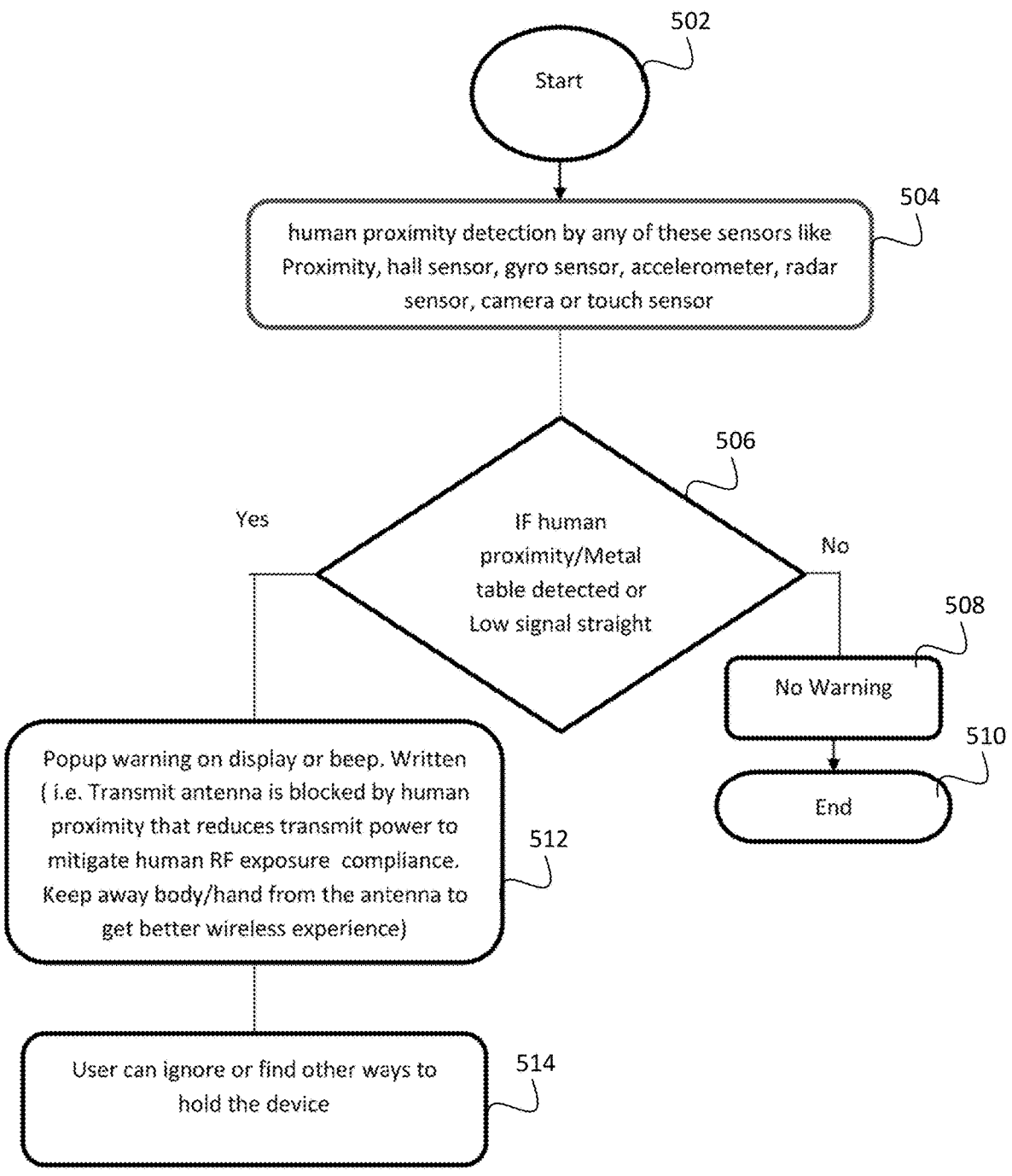
FIG. 5 depicts a flow chart for generating a user alert, according to a first configuration.

FIG. 5 depicts a flow chart for generating a user alert according to the first configuration of the first aspect of the disclosure, in which a proximity sensor is used to detect a human body part. Upon initiation 502, one or more proximity sensors generates proximity sensor data representing an object (e.g. a human body part) in close proximity to an antenna 504. Alternatively or additionally, the one or more proximity sensors may be configured to detect whether the user device is located on a metal table, which may negatively affect throughput. If a human body part is detected in close proximity to the sensor/antenna, or in the alternative configuration 506, if it is determined that the device is located on a metal table, the user alert is generated 512. If no human body part is detected in close proximity to the antenna at step 506, then no user alert is generated 508. The procedure then ends 510 until it is restarted at 502.

Figure 6:
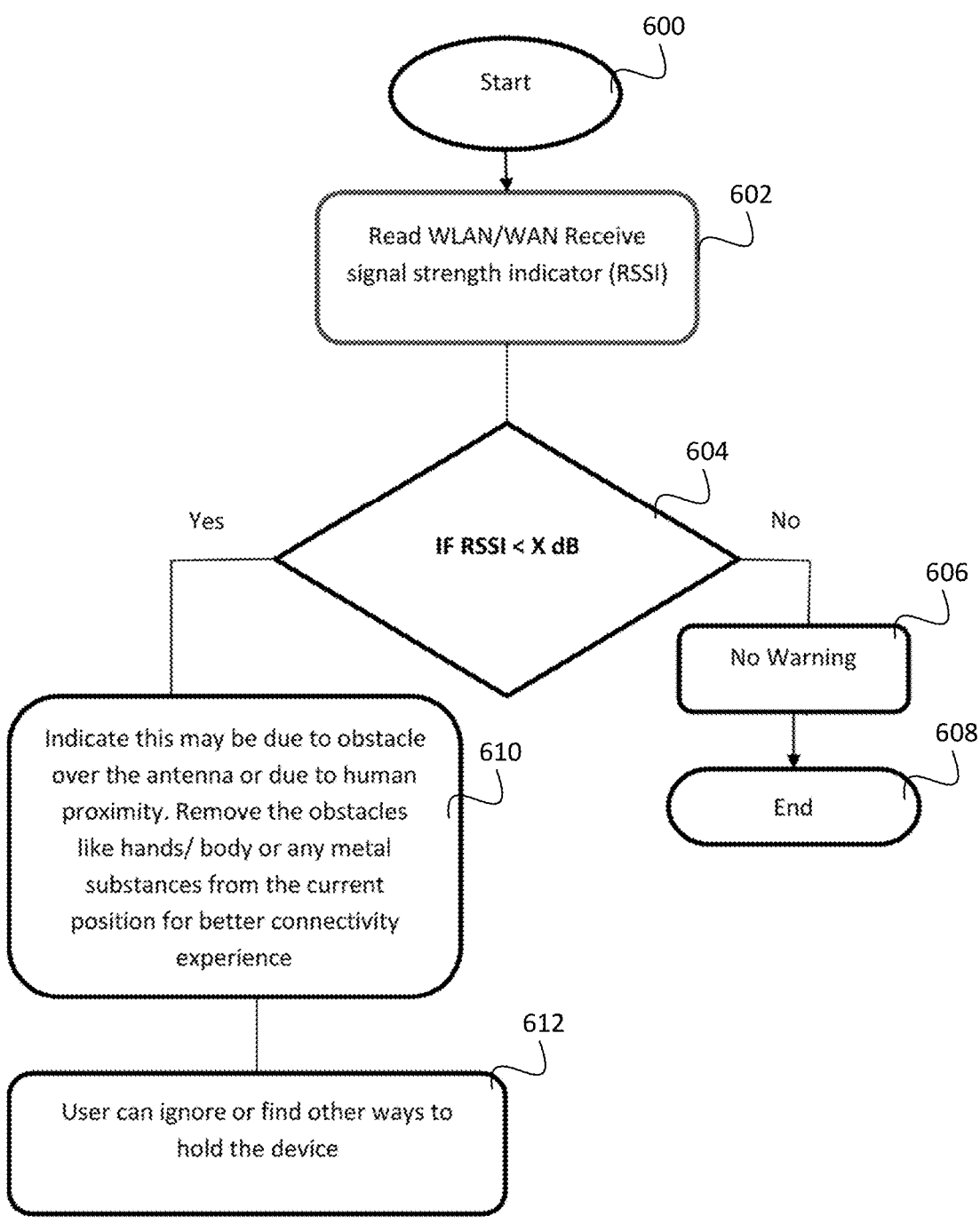
FIG. 6 depicts a flowchart for generating a user alert according to a second configuration.

FIG. 6 depicts a flowchart for generating a user alert according to the second configuration of the first aspect of the disclosure, in which the RSSI is utilized to detect an obstructed antenna. Upon initializing the procedure 600, the RSSI for a WLAN and/or WLAN antenna is determined 602. If the RSSI is less than a predetermined threshold 604, then the user alert is generated 610. The user may change the user's holding or positioning relative to the device, or the user may choose to ignore the message 612. If the determined RSSI is not less than a predetermined threshold 604, then that no warning is generated 606, and the procedure ends 608.

Figure 7:
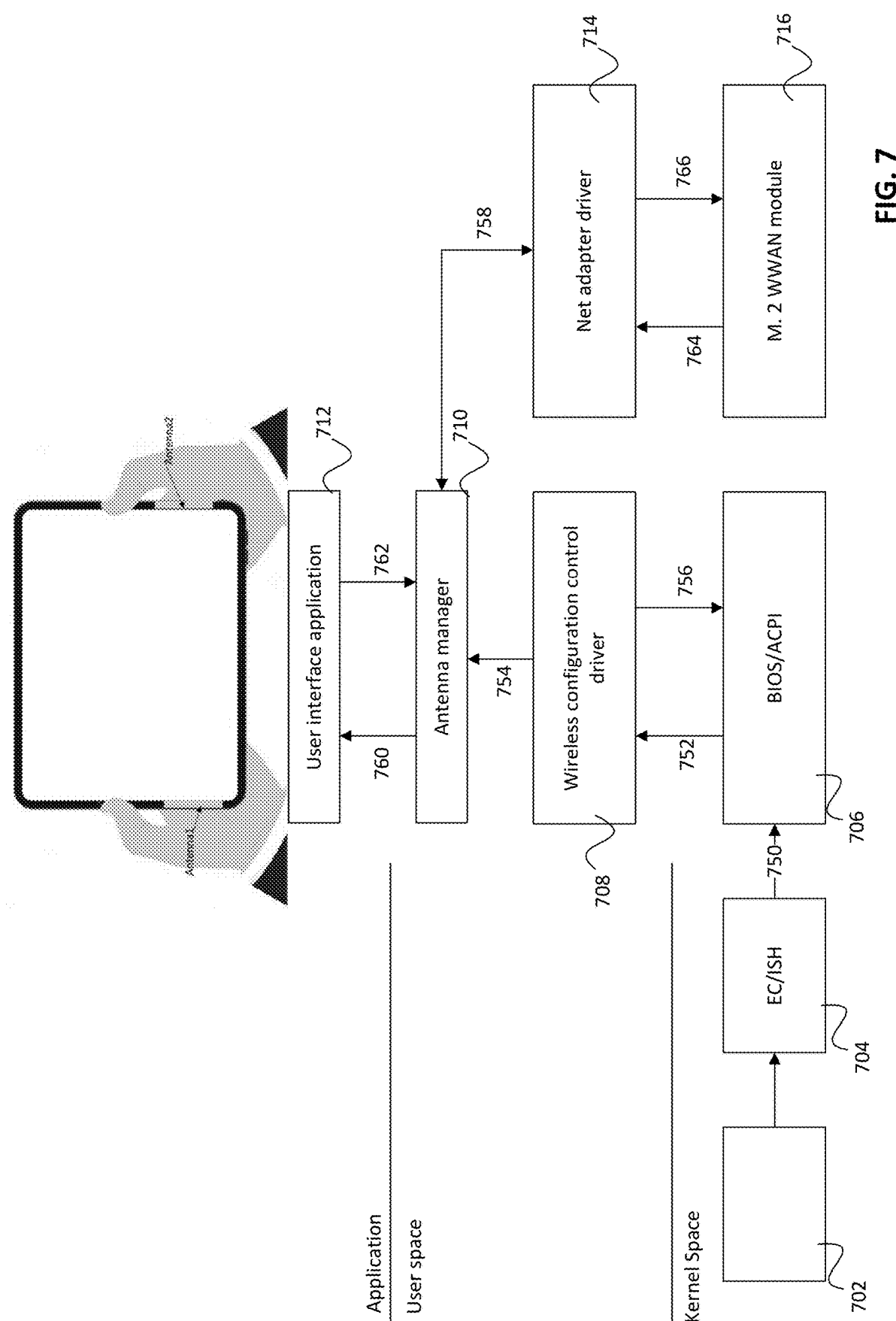
FIG. 7 depicts an exemplary end to end software architecture for the first aspect of the disclosure.

FIG. 7 depicts an exemplary end to end software architecture for the first aspect of the disclosure. This software architecture depicts the steps that occur after a user places the user's hand or body part near an antenna 702. This architecture includes an embedded controller/integrated sensor hub (ISH) 704 to detect antenna obstruction and report to the software basic input/output system (BIOS). The architecture further includes the BIOS/advanced configuration and power interface (ACPI) 706 to detect the ISH notification and report the device mode and obstruction details to the wireless connectivity kernel driver. The architecture further includes a wireless configuration control driver 708, which is configured to read the current device mode and notify the WWAN Antenna Manager about the Antenna obstruction and Device mode. The architecture includes an antenna manager 710, which is configured to receive the unsolicited RSSI notification from the underlying WWAN Module through the MBIM interfaces, which checks whether the RSSI value is lower than the threshold value, detects the device mode and antenna obstruction details, and creates user notifications about antenna obstruction. The architecture may include a user interface application 712, which is configured to notify the user about obstruction and required action from the user. The architecture may include a network adapter driver 714 and a baseband modem 716 (depicted as a M.2 WWAN module).

Upon the user placing the user's hand or body part within close proximity to the antenna at 702, the sensor hub 704 detects obstruction of the antenna and notifies the BIOS about the obstruction and device mode 750. The BIOS may store information pertaining to the user alert, such as in a distributed shared memory 752. The wireless configuration control driver 708 may notify the bios of the antenna information and device mode information 756. Additionally or alternatively to the steps described above, the baseband modem 716 may inform the net adapter driver 714 about the detected RSSI for the given antenna 764. The net adapter driver 714 may provide an unsolicited response of RSSI information to the antenna manager 710. The wireless configuration control driver 708 may provide the antenna manager 710 with information about the antenna obstacle, the antenna, and/or the device details. The antenna manager 710 may generate the user notification 760. The user interface application 712 may inform the antenna manager 710 that the antenna obstacle is still present 762. If the user chooses not to remedy the obstruction in response to the user alert, the antenna manager 710 may apply new SAR table values, which are passed to the net adapter driver 714. The net adapter driver 714 may notify the baseband modem 716 of the SAR reduction.

Figure 8:
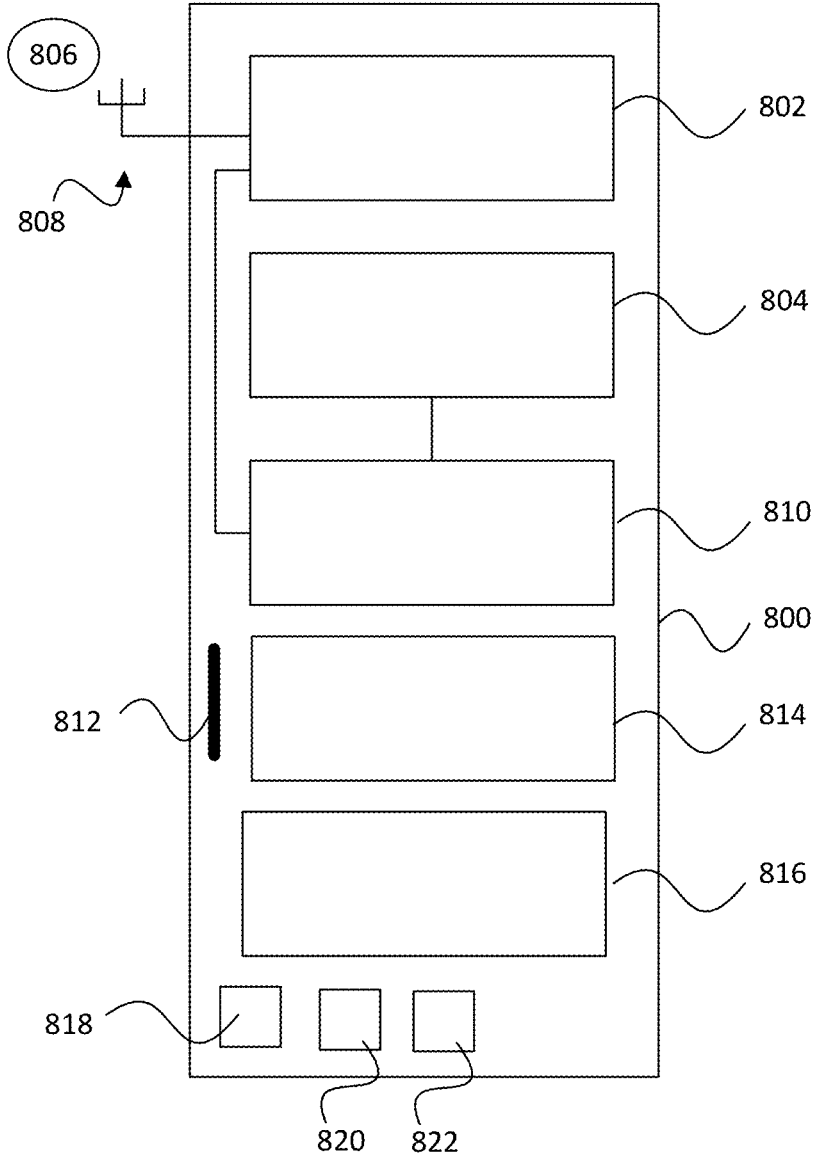
FIG. 8 depicts a computing device according to the first aspect of the disclosure.

FIG. 8 depicts a computing device 800 according to the first aspect of the disclosure. including an interface 802 to a radiofrequency circuit; a processor 804 coupled to the interface 802 and configured to receive proximity data representing a proximity of an obstructive object 806 to an antenna 808 coupled to the interface 806; determine whether the proximity data are within a range; and if the proximity data are within the range, generate a user alert. The computing device may further include the radiofrequency circuit 810, configured to send or receive a wireless signal over an antenna. The computing device may further include the antenna 808. The computing device may further include a proximity sensor, configured to generate the proximity data. The computing device may further include a baseband modem 814, configured to determine a signal strength of a wireless signal received on the antenna; wherein the proximity data are, or are derived from, the signal strength. The computing device may further include a display 816; wherein the user alert is a visual alert; and wherein generating the user alert includes the processor controlling the display to display the user alert. The computing device may further include an illumination device 818; wherein the user alert is a visual alert; and wherein generating the user alert includes the processor controlling the illumination device to generate the user alert. The computing device may further include a speaker; wherein the user alert is an auditory alert; and wherein generating the user alert includes the processor controlling the speaker to sound the user alert.

The computer device may further include a haptic alert device 822; wherein the user alert is a haptic alert; and wherein generating the user alert includes the processor controlling the haptic alert device to generate the user alert. The haptic alert device may be configured to generate a vibration of one or more parts of the computing device.

According to a second aspect of the disclosure, some tablet devices such as laptops or certain tablet computers include two portions that are connected via a connector (e.g. a hinge or other connecting member), thereby permitting the portions to move with respect to one another. For example, a laptop's screen portion may be moveable relative to its keyboard portion. Similarly, a dual-screen tablet computer may have a first screen portion that is moveable relevant to its second screen portion.

With respect to SAR regulations, and because many devices will have at least one antenna in the first housing portion, and at least one antenna in the second portion, the distance between the at least one antenna and the at least one second antenna may change depending on the configuration of the first housing portion to the second portion. When the first housing portion and the second portion are configured such that these two antennas are in close proximity to one another, the resulting SAR calculation may be affected. That is, a body part may be within a close proximity to both the first antenna, and the second antenna, thereby resulting in the body part being exposed to up to twice as much energy. In this situation, the SAR calculations must take into account this increased exposure (e.g. the exposure from both antennas).

Figure 9:
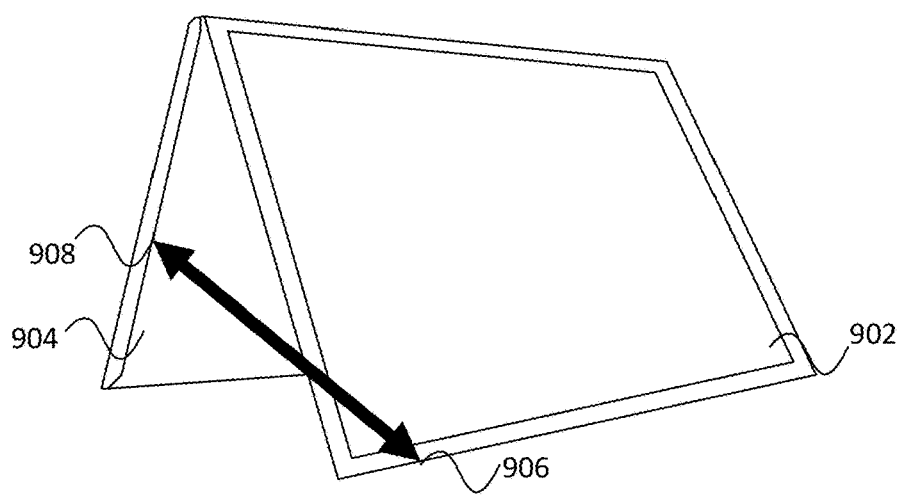
FIG. 9 depicts a computing device with a movable first housing portion and second housing portion.

FIG. 9 depicts a computing device with a movable first housing portion and second portion, according to the second aspect of the disclosure. In this figure, the computing device includes a first housing portion 902 and a second portion 904. In this exemplary configuration, the computing device is configured as a dual-screen tablet computer, with the first housing portion 902 being configured to include a first screen and the second portion 904 being configured to include the second screen.

Of note for this exemplary configuration, the computing device includes a first antenna 906 on its first housing portion 902 and a second antenna 908 on its second portion 904. The first antenna 906 and the second antenna 908 may be sufficiently far from one another when the computing device is laid flat that a human body part could not simultaneously be exposed to relevant magnitudes of energy (e.g. with respect to SAR regulations) from both antennas. However, as the device becomes folded upon itself, as depicted in FIG. 8, the first antenna 906 and the second antenna 908 are moved closer to one another. As they grow sufficiently close, it becomes possible that the human body part may be in sufficient proximity to each of the first antenna 906 and the second and tenant 908 such that they each admit electromagnetic radiation that is subject to a SAR limitation. In this manner, the radiation output of each of the first antenna 906 and the second and tenant 908 must be considered for the absorption rates of the singular body part. For context, it is noted that a human body part within 2-3 cm of a transmitting antenna could conceivably absorb energy in excess of a SAR regulation. Thus, the energy from two transmitting antennas could be absorbed by the same body part and thus violate a SAR regulation if the antennas are less than about 5 cm away from one another.

Conventionally, devices may rely on positioning sensors, such as sensors to detect whether a laptop's lid is open or closed and/or to determine whether such antennas may be in close proximity. Although this can be an effective way to check for this double SAR exposure, computing devices generally require at least one calibration to coordinate the positioning sensor (e.g. lid open or lid closed) data with a proximity of antennas on differing portions. This calibration may be time consuming, expensive, or otherwise undesired.

Instead of relying on positioning sensors for the double-antenna SARs calculation as described above, the proximity of two antennas (optionally there may be more than two antennas) may be detected via detection of radiofrequency leakage. Specifically, the computing device may measure the antenna isolation (e.g. measure radiofrequency leakage or radiofrequency transmission from one antenna of the computing device that is received by another antenna of the computing device) between two antennas and detect, based on the measured isolation, whether the distance between antennas is <5 cm, so as to require consideration of both antennas in evaluating a SAR condition.

In a practical example, a computing device may have both wireless wide area network (WWAN) and wireless local area network (WLAN) modems and may have a WWAN antenna in one portion of the computing device and a WLAN antenna in another portion of the computing device. The computing device may be configured to determine on a WWAN antenna a radiofrequency leakage from a WLAN antenna, or vice versa. Based on the detected magnitude of radiofrequency leakage, the computing device may determine a proximity of the WWAN antenna to the WLAN antenna. For this, the device may utilize, for example, a look up table, in which a value of detected radiofrequency leakage is associated with a distance between antennas. The values in this look up table may be specific to the device or model of the device, since this depends on the placement of each corresponding antenna relative to the connector (e.g. the hinge). This also depends on the transmit power of the transmitting antenna.

In a first configuration of the second aspect of the disclosure, the computing device may be configured to perform a radiofrequency leakage scan after any state change. For this purpose, a state change may be any change indicative of a possible change in position of the first housing portion relative to the second portion. This may be, for example, a change in a position sensor (e.g. a hinge sensor), or a change in other sensor data (e.g. accelerometer, etc.). After each state change, the computing device may initiate a power transmission on each transmit capable antenna and measure the resulting RSSI on all possible receive antennas (e.g., assuming different frequencies for signals transmitted by the device and signals received by the device, the received power (corresponding to RSSI) is generally also correspondingly reduced). Based on these measurements, the computing device may decide whether the distance between the transmit and receive antenna is within a critical range that would require consideration of the both antennas' outputs for SAR compliance. This critical range may be, for example, less than 5 cm, less than 4 cm, less than 3 cm, less than 2 cm, or less than 1 cm.

If a critical range is detected, the computing device may initiate a multiple radio SAR state. In this case, the device may optionally shorten transmissions over the WLAN and WWAN, may move WWAN transmissions to WLAN where possible, or may omit WWAN transmission. If a critical range is detected, the device may transmit with reduced power.

Figure 10:
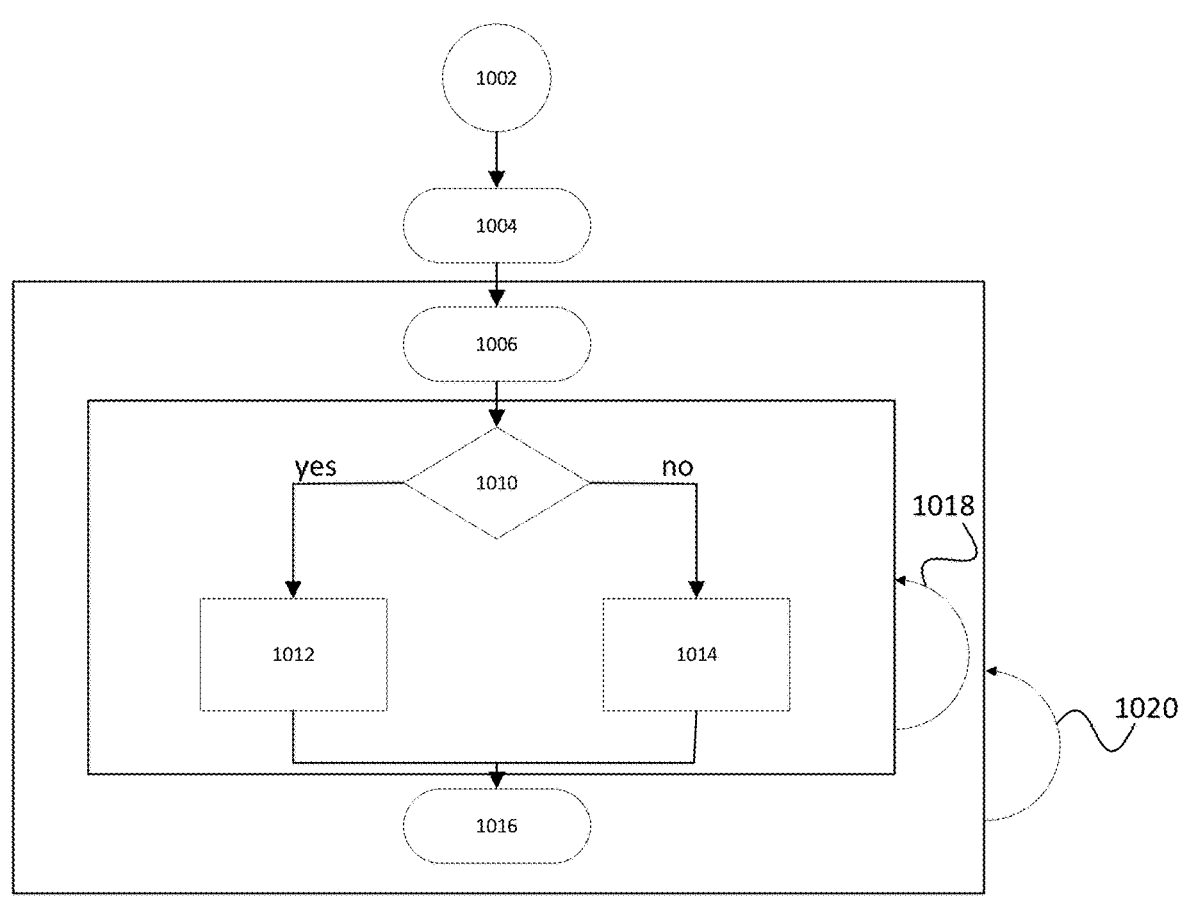
FIG. 10 depicts a configuration in which a radiofrequency leakage scan occurs after a state change.

FIG. 10 depicts a first configuration according to the second aspect of the disclosure, in which a radiofrequency leakage scan after a state change. After a platform state change 1002, a transmission antenna is set at step 1004 (e.g., "set TxAnt=1"). Thereafter, a transmission is performed on the selected transmission antenna and the RSSI of this transmission as received by each of the device's other antennas is determined at step 1006. For each of these determined RSSI values, a processor determines whether the RSSI as detected at a given antenna is greater than a threshold value 1010 ("RSSI(RxAnt)>Total Heat Dose (THD)"). The THD may be, for example, 30 dBm or 1 Watt. The THD may be derived based on the SAR limit imposed by the relevant authority of a given jurisdiction. If the RSSI is greater than the threshold value, then a SAR power reduction is imposed for each of the transmit antenna and the corresponding receive antenna at which the RSSI value above the threshold was detected ("SAR(TxAnt, RxAnt)= True") 1012. If the RSSI is not greater than the threshold value, then no SAR power reduction is implemented ("SAR (TxAnt, RxAnt)=False"). The transmit antenna then is allowed to transmit at the designated power, whether reduced power in the case of a SAR power reduction, or non-reduced power in the case of no SAR power reduction 1016. The evaluation of detected RSSI relative to the transmission threshold and corresponding potential power back offs at step 1010, 1012, and 1014 may be repeated for each antenna 1018. The selection of a transmit antenna and the transmission on that selected antenna may be repeated such that each antenna performs a transmission, and each antenna receives a transmission of each other antenna for purposes of calculating RSSI 1020.

In a second configuration of the second aspect of the disclosure, the computing device may be configured to operate in a passive mode. In this configuration, the device may measure radiofrequency leakage during a next regular transmission. In this case, a regular transmission is a transmission that would otherwise be scheduled, such as a user data transmission to the network or a transmission that would otherwise normally occur in the course of maintaining a network connection (e.g. Physical Uplink Control Channel (PUCCH), Physical Uplink Shared Channel (PUSCH), etc.) In this configuration, the computing device may need to assume a multi-SAR state (e.g. a state in which at least two antennas are within close proximity such that they both contribute to the applicable SAR regulations for a human body part) between the state change and the next regular transmission.

Figure 11:
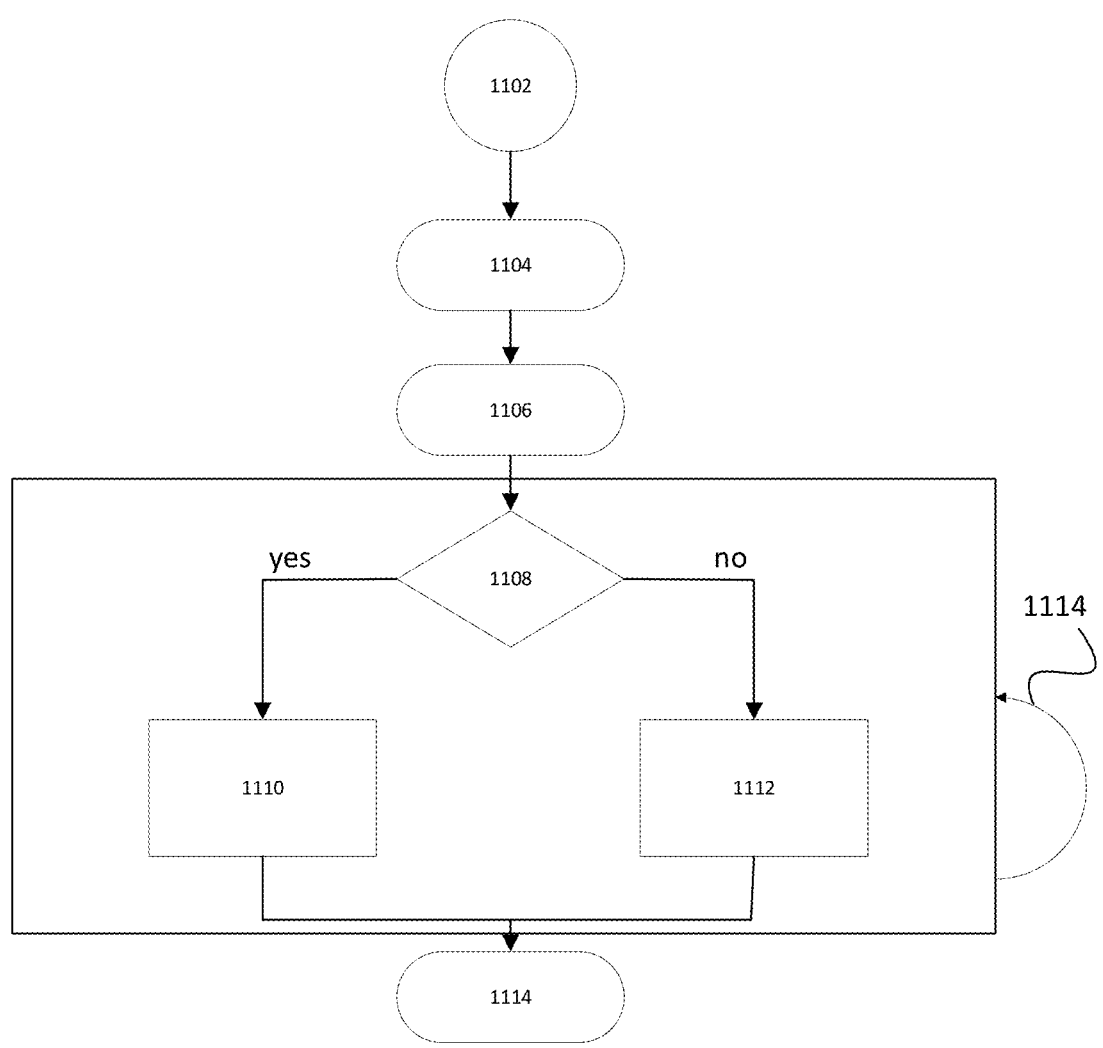
FIG. 11 depicts exemplary steps of the second configuration of the second aspect of the disclosure.

FIG. 11 depicts exemplary steps of the second configuration of the second aspect of the disclosure. In this figure, and when a platform state change occurs 1102, a series of steps is performed to determine whether any two or more antennas contribute to the absorbed radiofrequency energy of a single body part (referred to as a "multi-SAR condition") 1104. During the multi-SAR condition, and for any given antenna, the computing device waits until the first native transmission on the given antenna (e.g. the first otherwise scheduled transmission, the first transmission for purposes other than SAR evaluation) 1106. For the purposes of this step, the transmitting antenna may include a plurality of antennas. This transmission is then received on each of the remaining antennas, and an RSSI of the received transmission from the transmitting antennas on each of the receiving antennas is determined. It is then determined for each receiving antenna whether the corresponding RSSI exceeds a threshold value 1108. If the RSSI exceeds the threshold value, then a SAR limitation is imposed for each of the transmitting antenna and receive antenna ("SAR (TxAnt, RxAnt)=True") 1110. If the RSSI does not exceed the predetermined threshold at step 1108, then no SAR limitation is imposed ("SAT(TxAnt, RxAnt)=False"). Steps 1108, 1110, and 1112 may be performed for each transmit antenna (e.g. may be performed for each antenna as it is natively scheduled to transmit) 1114.

Should the antenna of the first housing portion and the antenna of the second portion be WWAN and WLAN antennas, respectively, or vice versa, accurate and reliable measurement of the isolation between WWAN antenna and WLAN antenna requires transmission and reception in overlapping frequency bands, e.g., Band 46 (5150-5925 MHz) and the 5 GHz unlicensed ISM band used by Wi-Fi.

Modern PC platforms would normally include up to four WWAN (e.g., LTE and 5G-New Radio) antennas, two of which support both Uplink and Downlink, i.e., Tx/Rx antennas, while the other two antennas are used for Downlink only, i.e., Rx antennas. The following table depicts a typical WWAN antenna configuration in PC.

| WWAN Ant | | Freq range | Bands near 2.4 GHz | Bands near 5-7 GHz |
|---|---|---|---|---|
| MAIN | DL/UL | 617 MHz-5925 MHz | B40, B41, B7 | n77, n79, B46, B47 |
| AUX (Diversity) | DL | 617 MHz-5925 MHz | B40, B41, B7 | n77, n79, B46, B47 |
| MIMO3 | DL/UL | 1427 MHz-4990 MHz | B40, B41, B7 | n77, n79 |
| MIMO4 | DL | 1427 MHz-4990 MHz | B40, B41, B7 | n77, n79 |

In an active sensing configuration, the WWAN main antenna could be set to transmit in Band 46, while measuring the RSSI at the Wi-Fi antennas at same frequency. However, the second WWAN transmit/receive antenna MIMO3 might not support Band 46 (e.g., if no UL MIMO or transmit antenna diversity in Band 46) and can transmit only up to 4990 MHz, i.e., there is no frequency overlap with Wi-Fi 5 GHz unlicensed band. In this case, the WWAN antenna could be set to transmit at 4990 MHz, and the RSSI at the Wi-Fi antennas could still be accurately measured by setting Wi-Fi LO to 5180 MHz and the Wi-Fi receive to a special wideband mode, which is normally designed for transmit self-calibrations, thereby allowing receipt of the WWAN transmitted signal at 4990 MHz. This assumes that the Wi-Fi antenna, radiofrequency front-end filter, and radiofrequency integrated circuit (e.g., the low noise amplifier) are sufficiently wideband to pass this frequency, which is normally the case.

Figure 12:
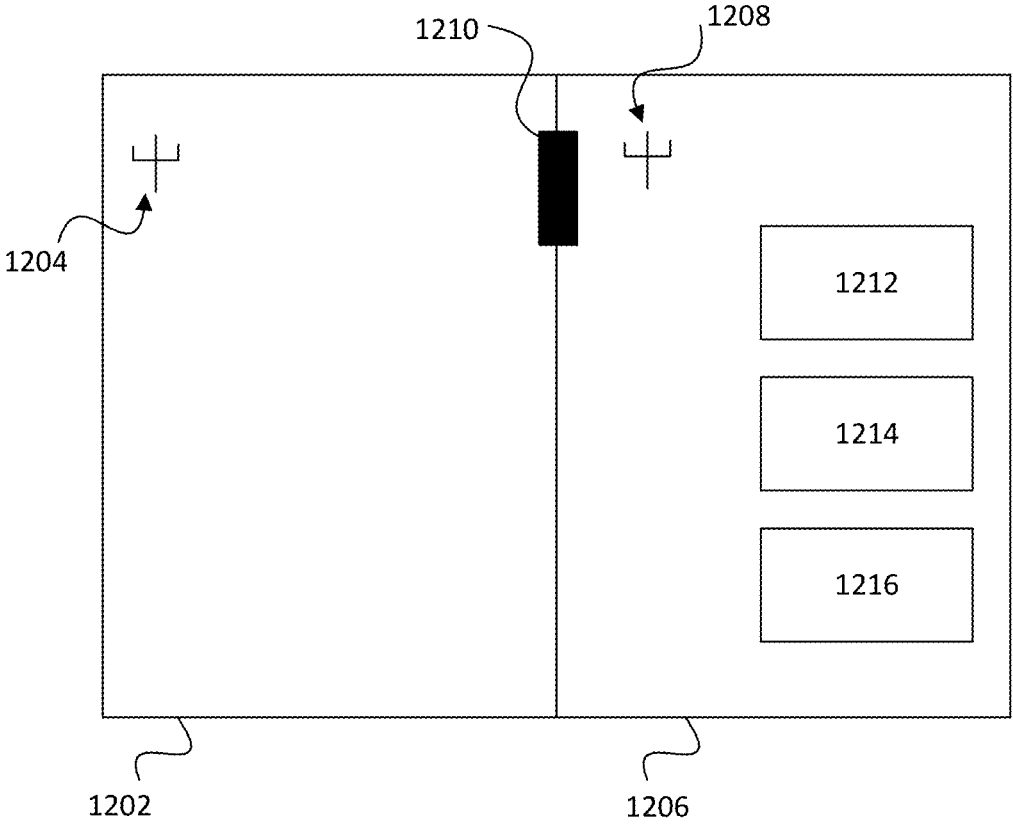
FIG. 12 depicts a computing device according to the second aspect of this disclosure.

FIG. 12 depicts a computing device according to the second aspect of this disclosure. The computer device includes a first housing portion 1202 that includes a first antenna 1204; a second portion 1206, including a second antenna 1208; a moveable joint 1210, configured to permit the first housing portion 1202 to move relative to the second portion 1206; one or more processors 1212, configured to determine a signal characteristic of a wireless signal sent from the first antenna 1204 and received on the second antenna 1208. The computing device may further include a first baseband modem 1214, configured to send the wireless signal over the first antenna 1204; and a second baseband 1216, configured to determine the signal characteristic of the received wireless signal. The signal characteristic may optionally be a received signal strength of the wireless signal. The one or more processors 1212 may optionally be further configured to determine whether to reduce (e.g., whether it is required to reduce) a maximum transmit power on the first antenna and/or on the second antenna based on the signal characteristic. If the signal characteristic is outside of a range, the one or more processors 1212 may be further configured to reduce a maximum transmit power on the first antenna 1204 and/or on the second antenna 1206. If the signal characteristic is outside of a range, the one or more processors 1212 may be further configured to reduce a total maximum transmit power on the first antenna 1204 and on the second antenna 1208 beneath a threshold; and wherein the signal characteristic is within the range, the one or more processors 1212 may be further configured to permit the total maximum transmit power on the first antenna 1204 and on the second antenna 1208 to be above the threshold.

According to a third aspect of the disclosure, proximity sensors can be etched and deposited into the chassis of a computing device rather than placing ready-made sensors or sensors otherwise independent of the chassis in the device. In this manner, a sensing pattern is etched and deposited into the computing device's chassis (e.g. housing, cover). This sensing pattern creates a capacitive plate on the existing chassis, and this capacitive plate is connected to a SAR controller (e.g. a SAR integrated circuit (IC), a SAR System on Chip (SOC), etc.). For a non-metal chassis, the pattern can be etched in inner layers and low cost connections (e.g. Pogo connections) may connect the capacitive plate to the SAR controller. For a metal chassis, the sensor pattern may be etched into an inner layer of the chassis, a dielectric material may be deposited onto the etched area, and then metal may be deposited onto the dielectric material in the sensor pattern, so as to create controlled capacitance between the pattern etched and chassis. In so doing, a capacitive smart sensor pad for human or object detection may be generated.

FIG. 13 depicts a proximity sensor according to the third aspect of the disclosure. The chassis 1302 of the computing device may be etched to create a recessed area for placement of the proximity sensor. If the chassis 1302 is or includes metal, a dielectric material layer 1304 may be deposited within the recess. A copper or other conductive metal deposition 1306 may be deposited on the dielectric material. The device chassis and the metal layer form a capacitor, which may be used to detect the presence of a human body part in close proximity to the capacitor. Should the chassis be made of an insulating material (e.g. plastic), a recess may be etched into the chassis and a first copper deposition 1306 may be placed in the recess, with a dielectric layer (not pictured) placed on top of the first copper deposition 1306, and a second copper deposition (not pictured) placed on top of the dielectric layer.

FIG. 14 depicts a deposited metal layer forming a proximity sensor in an alternative view. In this figure, the chassis 1302 has an etched recess into which a dielectric layer (not pictured) and metal contact 1306 is deposited. The metal contact 1306 may contain or include a trace conductive element, permitting the signal to reach to a contact, at which point it may be connected to a circuit for processing.

FIG. 15 depicts a computing device 1500 configured with multiple chassis-etched proximity sensors in close proximity to a corresponding antenna. Specifically, the computing device is configured with a first proximity sensor 1502 in close proximity to a first antenna 1504, a second proximity sensor 1506 in close proximity to a second antenna 1508, a third proximity sensor 1510 in close proximity to a third antenna 1512, and a fourth proximity sensor 1514 in close proximity to a fourth antenna 1516. This etching technique avoids the need for incorporation of additional sensing elements (e.g. freestanding sensing elements, sensing elements independent of the chassis) and corresponding flexible printed circuit (FPC) connectors while simplifying sensing and cabling for SAR management.

FIG. 16 depicts a computing device 1600 including a chassis, including an inner portion 1602 and an outer portion 1604; a metal film 1606, deposited on the inner portion of the chassis; and 1608 a controller, configured to determine a proximity of an object 1610 near the outer portion 1604 based on an electrical charge at the metal film. If the detected proximity is outside of a range, the controller 1608 being configured to operate according to a first operational mode; and wherein if the detected proximity is within the range, the controller 1608 is configured to operate according to a second operational mode. The computing device may further include an antenna 1612 in a vicinity of the metal film; wherein operating according to a first operational mode includes controlling a baseband modem 1614 to limit a transmission power at the antenna to less than a maximum transmission power; and wherein operating according to the second operational mode includes controlling the baseband modem 1614 to permit transmission on the antenna 1612 at the maximum transmission power. The chassis may be optionally primarily composed of a dielectric material; wherein the metal film 1606 is a second metal film; further a second metal film 1616 (optionally designated by dashed lines) deposited under the dielectric film 1612.

According to a fourth aspect of the disclosure, and in conventional implementation of cellular modems, transmissions typically take places through a dedicated antenna and thereby continuously exposes the same portion of the human body (e.g. the same human body part, the same portion of the human body part) to electromagnetic radiation from transmissions. This results in a rise in temperature of the exposed body area. Regulatory SAR limits include different measurement distances for the head and other body parts. The body SAR needs to be measured at 0 mm distance, whereas the head SAR will be measured at 10 mm distance. This fourth aspect of the disclosure makes use of this 10 mm distance concept. By allowing the radiating element to move 10 mm farther from body, the radiofrequency exposure to the corresponding human body tissue is reduced. The principles and methods disclosed with respect to the fourth aspect make use of proximity detection along with a hardware function that increases the distance between the transmitting antenna and the relevant human body part.

This fourth aspect of the disclosure relies on proximity sensor data from a proximity sensor (this may be a conventional proximity sensor, any proximity sensor or proximity sensor as disclosed herein, or any other proximity sensor) to detect the computing device's proximity to human body. When the transmission power is more than the SAR threshold power limit and the proximity detects the presence of a human body, the hardware mechanism is activated and the device chassis and radiating element will be lifted away from the body. In an optional configuration, this lifting is 10 mm or greater than 10 mm. In this manner, the radiofrequency exposure to the human body is reduced without reducing the transmit power. By maintaining transmit power (e.g. by not reducing transmit power), the wireless link is preserved and the link instability associated with reduced transmit power is preserved.

The hardware structure as disclosed herein reduces SAR exposure and enhances the airflow to the computing device, thereby also including the benefit that it improves the device's thermal regulation. When the transmit power increases outside of a range (e.g. beyond a threshold) and human proximity is detected using a proximity sensor, the mechanical structure will lift the system from the base (lap). In one configuration, the lifting may be by 10 to 20 mm, by 5 mm to 15 mm, or by 10 mm to 15 mm. In so doing, dynamic power may be reduced to levels that no longer require power backoff or other strategies to reduce energy emission from a given antenna, which helps to maintain the wireless link.

FIG. 17 depicts a computing device according to the fourth aspect of this disclosure. The computing device includes a first portion 1702 or chassis, which may optionally be a portion that would otherwise be rested upon a table or a user's lap. The computing device may further optionally include a second portion 1704, which may be configured as a display. The first portion 1702 includes a third portion 1706 or base, which is a movable extension. Where the first portion 1702 or chassis rests horizontally along the x-axis and y-axis, the third portion 1706 or base is configured to move along the z-axis, such that it alternatively moves into and extends from the first portion 1702 or chassis. In a retracted position, a bottom surface of the third portion 1706 or base may be flush or essentially flush with a bottom surface of the first portion 1702 or chassis. In an extended position, the bottom surface of the third portion 1706 or base may extend lower than (e.g. away from) the bottom surface of the first portion 1702 or chassis, such that a delta between the bottom surface of the third portion 1706 or base and the bottom surface of the first portion 1702 or chassis is several millimeters. In a first configuration, the Delta is at least 10 mm. In a second configuration, the Delta is at least 15 mm. in a third configuration, the Delta is at least 20 mm.

FIG. 18A depicts an optional configuration of a device for moving the base in relation to the chassis. In this figure, the base includes at least one a variable block 1802 and at least one rubber foot 1804. Each of the at least one a variable block 1802 and at least one rubber foot 1804 is attached to at least one cam assembly 1806 via a cam pin 1808. The at least one cam assembly includes a motor, which is attached to the chassis. In this manner, rotation of the motor causes an extension of the base (via the variable block and rubber foot) away from the body or chassis. FIG. 18B depicts a close-up version of the cam assembly, showing the motor 1850, motor gear 1852, cam gear, and cam. It is expressly noted that the motor and cam assembly configuration depicted in FIGS. 18A and 18B is merely one of many potential configurations for extending the base away from the chassis as described herein. This exemplary configuration is provided for demonstrative purposes and is not intended to be limiting.

The computer device may be configured to extend and retract the base relative to the chassis based on information derived from one or more proximity sensors. For example, one or more proximity sensors may be located within the chassis in a vicinity of one or more corresponding antennas. As described herein throughout, the one or more proximity sensors are configured to detect a proximity of a human body part within a vicinity of the sensor. These one or more proximity sensors may be mounted on or near a lower portion of the chassis, such that they will detect a human body part when the chassis is placed on a user's lap, such as is common for operation of a laptop. A processor may receive the proximity sensor data and control the motor to extend or retract the base with respect to the chassis. That is, when a human body part (e.g. a lap) is detected in close proximity to the proximity sensor, the processor may control the motor to extend the base away from the chassis, so as to increase the space between the corresponding one or more antennas and the human body part. In this manner, sufficient distance can be introduced between the one or more antennas and the human body part so as to protect the human body part from radiation absorption without the need for power backoff or alternatively with only minimal or modest power backoff. Conversely, when the one or more proximity sensors detect no human body part within close proximity to the one or more proximity sensors, the processor may control the motor to retract the base with respect to the chassis, such that a bottom portion of the chassis is flush or nearly flush with a bottom portion of the base.

In an optional configuration, the processor may be configured to take into account the transmit power of the one or more antennas (e.g. the one or more antennas mounted at or near a bottom side of the chassis) in deciding whether to extend the base away from the chassis. In this configuration, and upon the one or more proximity sensors detecting the presence of a human body part in close proximity to the one or more proximity sensors, the processor may evaluate the current transmit power for the one or more corresponding antennas. If the transmit power is already reduced (e.g. during a power backoff), and the base is retracted, the processor may opt not to extend the base, as no extension would be necessary in light of the power backoff. If, however, the one or more proximity sensors detect a human body part within close proximity to the one or more proximity sensors, and if no power backoff has been initiated, the processor may control the motor to extend the base away from the chassis.

In accordance with this fourth aspect of the disclosure, a computing device may include a chassis, including an opening, configured to receive a base; the base, arranged in the opening, and configured to move relative to the chassis; a proximity sensor, configured to detect a human body part and to generate proximity sensor data representing a distance between the proximity sensor and the human body part; and a processor, configured to control an actuator to move the base relative to the chassis based on the proximity sensor data. The computing device may include the actuator. The actuator may include the motor and cam assembly depicted in FIGS. 18A and 18B. The base is configured to move into and out of the chassis and may include a top side and a bottom side; wherein the top side faces an interior of the chassis and the bottom side is opposite the top side; and wherein, in a recessed position, the base is configured to rest relative to the chassis such that the bottom side is essentially parallel with an outer surface of the chassis. In an optional configuration, controlling the actuator to move the base relative to the chassis based on the proximity sensor data includes determining whether the proximity sensor data are outside of a range, and if the proximity sensor data are outside of the range, controlling the actuator to move the base away from the chassis.

According to a fifth aspect of the disclosure, a damper may be used to directionally dampen energy from a transmitting antenna so as to protect a human body part in close proximity to the antenna while maintaining transmit power (e.g. while avoiding a power back off). As described above, SAR regulations impose limits on energy radiated from an antenna in close proximity to a human body part. Conventional approaches for satisfying the relevant SAR requirements typically involve a reduction of transmit power (e.g. power back off). Rather than reducing the transmit power, a damper can be placed between the transmitting antenna and an area where a user's body part would rest. In this manner, energy emanating from the antenna may be dampened between the antenna and the human body part, while remaining undampened in other directions. This may be achieved using either of two configurations.

In the first configuration, one or more ferroelectric materials (referred to herein as the "ferroelectric sheet") may be placed in close proximity to the computing device's antenna. The ferroelectric sheet may include multiple layers of ferroelectric material, each layer having a different dielectric constant. The dielectric properties of the ferroelectric sheet may be controlled using a DC bias voltage, such as when the human body part comes in close proximity to the antenna. The ferroelectric sheet has multiple dielectric values due to the DC bias voltage, and this in turn scatters antenna radiation away from the human body part while not blocking the radiations in other directions. The ferroelectric sheet may include layers of ferroelectric materials with different dielectric constants.

In a normal scenario, when the human body part is not in close proximity to the computing device's antenna, the ferroelectric sheet is kept in an unbiased state. In this condition, the relative permittivity of the ferroelectric sheet is lower than 4. Accordingly, the ferroelectric sheet is essentially "transparent" to the electromagnetic radiation originating from computing device's antenna located under the sheet. In other words, the ferroelectric sheet has little, if any, effect on the radiation pattern or magnitude of the energy emanating from the transmitting antenna.

In a scenario in which the human body comes in close proximity to the laptop's antenna, however, the SAR sensor detects the human proximity to the antenna and triggers the application of a DC bias voltage to the ferroelectric sheet. This DC bias voltage may be generated, for example, using a DC bias generator. The DC bias voltage may be applied to metal parts of the antenna which generate an electric field surrounding ferroelectric sheet. The ferroelectric sheet is then biased due to the electric field. Its permittivity increases in a staggered fashion due to stacking of ferroelectric materials of different permittivity values. This causes the ferroelectric sheet to scatter the radiation from the antenna away from the human body. Antenna radiation still occurs and remains unaffected in other directions away from the human body.

FIG. 19 depicts a computing device including a damper as described according to the first configuration of the fifth aspect of the disclosure. In this configuration, the computing device includes a housing 1902 (e.g. a chassis) that includes an antenna 1904 connected to a circuit 1906 (e.g. a processor, and integrated circuit, a motherboard, etc.). The antenna 1904 is configured to radiate electromagnetic signals for wireless communication. A ferroelectric sheet 1908 is present between the antenna and an exterior portion of the housing or chassis. Cable 1910 may be electrically biased with a DC voltage that is applied to one or more metal parts of the antenna and the radiofrequency signal.

FIG. 20 depicts a configuration for applying a bias voltage to an antenna for use with the ferroelectric sheet in accordance with the first configuration of the fifth aspect of the disclosure. Here a proximity sensor (e.g. a SAR sensor) 2002 is connected to a DC bias generator 2004. The DC bias generator may be configured to generate and apply a DC bias voltage. The radiofrequency module 2006 is also connected to the antenna 2008 as stated above, the ferroelectric sheet is placed between the antenna and the housing or chassis. The radiofrequency module may be connected to the antenna via a capacitor 2010, which may permit the alternating electrical signals to be transmitted on the antenna, while isolating the radiofrequency module 2006 from the DC bias generated at the DC bias generator 2004.

FIG. 21 depicts a ferroelectric sheet according to the first configuration of the fifth aspect of the disclosure. The ferroelectric sheet may include a plurality of ferroelectric layers, each layer having a different dielectric constant. In this exemplary configuration, the ferroelectric sheet includes four layers: a first layer 2102 with a permittivity of $\varepsilon=10$, a second layer 2104 with a permittivity of $\varepsilon=15$, a third layer 2106 with a permittivity of $\varepsilon=20$, and a fourth layer 2108 with a permittivity of $\varepsilon=25$. This four layer configuration is provided for demonstrative purposes only and is not intended to be limiting. The ferroelectric sheet may include fewer or more than four layers.

FIG. 22A depicts an emission pattern of a conventional omnidirectional antenna without the inclusion of the ferroelectric sheet as described herein. FIG. 22B depicts an emission pattern of the conventional omnidirectional antenna with the addition of the ferroelectric sheet as disclosed herein. Comparing FIG. 22A to 22B, it is apparent that the ferroelectric sheet dampens the radiation emission and thereby serves a protective function to human tissue in a vicinity of the ferroelectric sheet. That is, the simulation results show that the ferroelectric sheet blocks antenna radiation in the direction of the human body when in the biased condition. When the human body is not in close proximity to the antenna, the ferroelectric sheet remains unbiased and the ferroelectric sheet has little to no dampening effect on the radiation pattern as depicted in FIG. 22A.

In a second configuration according to the fifth aspect of the disclosure, graded dielectric material may be used instead of the ferroelectric sheet to dampen the energy emitted from the transmitting antenna. In this manner, dielectric material of different electrical properties such as different dielectric constants (dK) and dielectric losses scatters the near electromagnetic field and thus avoids creating a hotspot where the electromagnetic energy would otherwise be concentrated. This reduces the SAR value and thereby fosters compliance with the relevant SAR requirement.

FIG. 23 depicts a sheet of graded dielectric material as described according to the second configuration of the fifth aspect of the disclosure. In this exemplary configuration, four materials of differing dielectric constants are placed adjacent to one another such that first sheet 2302 has a first dielectric constant; second sheet 2304 has a second dielectric constant, greater than the first dielectric constant; third sheet 2304 has a third dielectric constant, greater than the second dielectric constant; and fourth sheet 2304 has a fourth dielectric constant, greater than the third dielectric constant. This sheet of differing dielectric constant materials may be used in place of the ferroelectric sheet as depicted in any of FIG. 19, 20, or 21.

FIG. 24 depicts a computing device in accordance with the fifth aspect of the disclosure. The computing device may include a housing 2402; an antenna 2406; a ferroelectric sheet 2408 between the housing and the antenna; and a processor 2410, configured to control a circuit 2412 to apply a direct current biasing voltage to the antenna based on proximity sensor data. The computing device may further include a proximity sensor 2414, configured to generate a proximity sensor signal (e.g. a signal having an amplitude, or a signal corresponding to proximity sensor data) representing a proximity of a human body part to the proximity sensor. The ferroelectric sheet may include a plurality of layers as depicted in FIG. 21, and each layer of the plurality of layers may have a different dielectric constant. The processor may be further configured to determine whether data of the proximity sensor representing a detection of its vicinity (e.g. whether a human body part is present) are outside of a range, and if the proximity sensor signal is outside of the range, the processor may be configured to control the circuit to generate the bias voltage on the antenna based on proximity sensor signal. Wherein if the proximity sensor signal is within the range, the processor is configured to control the circuit to not generate the electrical charge on the ferroelectric sheet based on proximity sensor signal. That is, when the signal is within a range indicating no SAR scenario, the electrical charge (e.g. the DC bias voltage) is not generated. Conversely, when the sensor signal is outside of the range (e.g. indicating a SAR scenario), the electrical charge is generated.

In the alternative configuration in which the multiple dielectric materials are used instead of the ferroelectric materials, the computing device may include a housing; an antenna; a radiofrequency signal dampener, including a dielectric material, between the housing and the antenna. The radiofrequency signal dampener may include a plurality of regions, each region of the plurality of regions having a different dielectric constant. The plurality of regions may be arranged adjacently to one another in a single layer.

A SAR event (e.g. a user's body part partially or completely obscuring an antenna) can result in significant transmit power reductions. For example, a user's coming in close proximity to any of the antennas in the a device (e.g. whether WLAN or WWAN) will trigger a SAR event, which may often result in a power reduction of 50% or more. When the antenna power is reduced, the Quality of Service (QoS) is correspondingly reduced. In this situation, it may be preferable to switch to another network that has a better QoS than the network whose transmit power has been reduced due to a SAR event and therefore suffers from lower QoS.

FIGS. 25A and 25B, together, depict a device switching networks to improve QoS during a SAR event. FIG. 25A depicts a first instance prior to a SAR event. In this exemplary configuration, a computing device 2502 includes a wireless local area network radio 2504 and a wireless wide area network radio 2506. Both a wireless local area network access point 2508 and a wireless wide area network base station 2510 are available, and the device is communicating over the wireless local area network radio 2504 with the wireless local area network access point 2508. A SAR event occurs (e.g. a user places the user's hands over the transmitting antenna for the wireless local area network 2504), and the quality of service suffers. To recover, the device performs a network scan and determines that the wireless wide area network is available. This network scan may be specified by the various wireless communication protocol used in the WLAN or WWAN. In the scans, the device will typically scan the available wireless frequencies and determine QoS for the available network(s).

FIG. 25B depicts the switching operation. In this figure, the computing device 2502 has moved from transmitting on the wireless local area network 2504/2508 (whose antenna is obscured and therefore suffers from poor QoS) to the wireless wide area network 2506/2510. By switching to the network whose antenna is not obscured by the user's body part, the device is able to achieve a higher quality of service than would otherwise be available using the former network.

However, this switching will conventionally not occur until the next fresh network scan, during which the device finds out that another network with better QoS is available. Although wireless devices are configured to perform network scans periodically, this periodic scan and selection of the new network adds a few milliseconds to a few seconds of delay, during which time the device can suffer from network outage and/or connection failure. Obviously, this leads to poor user experience.

According to this sixth aspect of the disclosure, and upon occurrence of a SAR event, the device may switch to an alternative available network before performing a network scan. An integrated sensor hub (ISH) can handle the SAR events and inform the wireless software (SW) framework which antenna (e.g., WLAN or WWAN) caused the SAR event. With this information, the wireless SW framework decide to switch to a different network.

In this sixth aspect of the disclosure, however, procedures are disclosed for the computing device to switch to a new network without first waiting until a network scan is performed.

In the conventional method for network switching, a computing device may have an active network connection data transfer in a first network. During this active network connection, a SAR event occurs on an antenna for the first network. Resulting from the SAR event, the computing device begins a SAR power reduction for the transmit antenna encountering the SAR event. Thereafter, the computing device performs a fresh network scan and QoS calculation and, based on the results of the network scan (e.g. based on the QoS from the network scan), the computing device decides to switch to second network. Although the computing device has been able remain SAR compliant and has ultimately changed the network to a network whose antennas are not suffering a SAR event, the computing device has experienced significant latency in the network switching event.

In the network switching method according to the sixth aspect of the disclosure, the computing device has an active network connection and data transfer on a first network when it experiences a SAR event on an antenna for the first network. Because of the underlying SAR regulations, the computing device immediately begins a SAR power backoff for the affected antenna. Instead of waiting to perform the network scan, however, the computing device estimates the new effective QoS of the first network with the reduced antenna TX power. The computing device already has stored in memory the QoS for the other networks available during the last network scan. Therefore, the computing device will compare the estimated QoS of the first network during the SAR event with the stored QoS results from the last network scan. If a second network has a higher stored QoS from the last network scan, then the computing device will switch to the second network. The second device can then optionally perform a fresh network scan and QoS calculation, such as for correction.

FIG. 26 depicts the network switching operation according to the sixth aspect of the disclosure. The computing device begins with an active network connection on a first network, performing data transfer 2602. During the active network connection, a SAR event occurs on an antenna for the first network 2604. In order to maintain compliance with the underlying regulations, the computing device begins a power backoff (e.g. power reduction) on the affected antenna 2606. The computing device, then estimates the QoS of the first network with the power back off on the affected antenna and decides whether the estimated QoS is lower than the last known QoS of a second network (e.g. based on the last network scan) 2608. If the estimated QoS is lower on the first network than the last known QoS on the second network, then the computing device switches to the second network before performing a new network scan 2610. If the estimated QoS is not lower on the first network than the last known QoS on the second network, then the device will perform a new network scan before switching to the second network. Assuming a switch to the second network at 2610, the device will then perform a new network scan 2612 and may optionally correct the network based on the result of the network scan.

Additionally or alternatively, hysteresis can be added to avoid continuous switching between the networks. By so doing, the computing device may be configured to recognize its first network as a network having an impaired QoS due to a SAR event and may be configured not to switch back to the first network until at least after the next network scan (e.g. depending on the QoS from the next network scan). Similarly, the device may be optionally configured to remain on the second network until after completion of the network scan and/or unless the QoS from the second network degrades or is estimated to have degrades (e.g. based on a SAR event).

In a further optional configuration that may be combined with any other optional configuration according to the sixth aspect of the disclosure, the computing device may be configured to incorporate battery status in the network switching decision. In this manner, the computing device may determine an availability of battery resource (e.g. an available charge, a voltage measurement from the battery, a percent of available battery resources, an estimated time of usage available, or otherwise), and may consider this battery resource in deciding whether to switch to the second network. For example, if the first network is a WLAN (e.g. Wi-Fi) network, and the second network is a WWAN (e.g. 5G) network, the second network would be expected to require significantly more power and thus represent a greater burden on the available battery resources. Accordingly, the computing device may be configured to postpone switching to the second network until another network scan is performed. Alternatively or additionally, the computing device may select an alternative network (e.g. a third network) having a greater QoS than the estimated QoS of the first network, but also having a lower QoS than the second network, if the third network is understood to represent a lower power burden to the computing device.

In a further optional configuration that may be combined with any other optional configuration according to the sixth aspect of the disclosure, the computing device may consider latency tolerance levels from content/workloads in selecting a second network. In this manner, the computing device may be configured to determine a latency tolerance of its current workloads and take this determination into considering in proceeding with the network switch. For example, the computing device may be performing a voice call or video game streaming other latency intolerant event. In this manner, the computer device may be configured, where possible, to select an available second network before completing the net network scan, as described herein. Conversely, if the computing device is performing only latency tolerant workflows, the computing device may be configured to perform a new network scan before switching networks.

FIG. 27 depicts a computing device according to the sixth aspect of the disclosure. The computing device may include a first antenna 2702; a second antenna 2704; a memory 2706, configured to store a first signal parameter corresponding to the first antenna and a second signal parameter corresponding to the first antenna; a proximity sensor 2708, configured to detect a proximity of a human body part near the first antenna and to generate proximity sensor data representing the detected proximity of the human body part; and a processor 2710, wherein if the proximity sensor data is outside of a range, the processor is configured to determine a third signal parameter corresponding to the first antenna, and if the second signal parameter is greater than the third signal parameter, the processor is configured to control a baseband modem to send a wireless signal over the second antenna. The processor 2710 determining the third signal parameter may include the processor 2710 determining the third signal parameter based on the first signal parameter and the proximity sensor data. The processor 2710 determining the third signal parameter based on the first signal parameter and the proximity sensor data may include the processor 2710 determining the third signal parameter based on the first signal parameter and the proximity sensor data 2708 from a look up table. If the proximity sensor data is outside of the range, and if the third signal parameter is less than the second signal parameter, the processor 2710 may be configured to control a baseband modem 2712 to send the wireless signal over the second antenna before performing a network scan for a radio access technology corresponding to the second antenna. If the proximity sensor data is outside of the range, and if the third signal parameter is less than the second signal parameter, the processor 2710 may be configured to control the baseband modem 2712 to send the wireless signal over the second antenna before performing an additional quality of service calculation for the second antenna. Here, it is expressly noted that the computing device may optionally include a first baseband modem 2712 (e.g., configured for transmission on a WLAN network) and a second baseband modem 2714 (e.g. configured for transmission on a WWAN network), and where an antenna for the first baseband modem 2712 experiences a SAR event, the processor 2710 may optionally control the second baseband modem 2714 to send the wireless signal before performing the next network scan.

Additionally or alternatively, each of the first signal parameter, the second signal parameter, and the third signal parameter may be a quality of service value or a value representing a quality of service value. If the proximity sensor data is outside of the range, and the third signal parameter is greater than the second signal parameter, the processor may be configured to control a baseband modem to send the wireless signal over the first antenna. In an optional configuration, the first antenna may be configured to send or receive a wireless signal according to a wireless local area network protocol and the second antenna is configured to send or receive a wireless signal according to a wireless wide area network protocol; or the first antenna is configured to send or receive a wireless signal according to a wireless wide area network protocol and the second antenna is configured to send or receive a wireless signal according to a wireless local area network protocol. Alternatively or additionally, each of the first antenna and the second antenna may be configured to send or receive a wireless signal according to a wireless local area network protocol; or each of the first antenna and the second antenna may be configured to send or receive a wireless signal according to a wireless wide area network protocol. The computing device may be configured to perform a network scan for a wireless network corresponding to the first antenna after sending the wireless signal over the first antenna.

According to the seventh aspect of the disclosure, data from a proximity sensor may be combined with other sensor data to reduce the probability of a false positive detection of a human body part.

A proximity sensor being used to detect a human body part must be capable of rendering zero, or as close to zero as possible, false-negative detections of a human body part, as a false-negative detection could result in violation of the applicable SAR regulations. Conversely, the proximity sensor must be capable of operating with as close to zero as possible false positive results, as a false positive unnecessarily disrupts the regular network procedures. In accordance with a first configuration of the seventh aspect of the disclosure, proximity sensor data may be combined with data from one or more other sensors to reduce the probability of a false positive detection.

In this first configuration, available independent body proximity sensors may be used to reduce the false alarm probability of the wireless based body proximity sensor in SAR limited platforms. The proximity sensors as disclosed herein with respect to the seventh aspect of the disclosure may include, but are not limited to, capacitive proximity sensors, inductive proximity sensors, wireless transmission based proximity sensors (e.g. a baseband modem configured to detect proximity from reflected radiofrequency signals from a human body part or object), or any other type of proximity sensor that may detect the presence of a human body part. Upon sensing body proximity, the proximity sensor may be configured to further consider other sensor data. This other sensor data may include, but is not limited to, platform orientation and/or ultra wide band (UWB) positioning sensors, which will be referred to herein collectively with respect to the seventh aspect of the disclosure as secondary sensors. Any of these secondary sensors may be excessively sensitive (e.g. may generate a false positive result), which, again, is to be avoided where possible.

The probability of a false positive may be reduced by requiring both a positive detection of a human body part by the proximity sensor and by one or more secondary sensors. In other words, the detection of a human body part may be based on the joint probability that the human body part is detected both by the proximity sensor and the secondary sensor. Because the probability of a false positive for each of the proximity sensor and the secondary sensor is less than one, the joint probability represents a multiplication of the two probabilities, resulting in a joint probability far less than any of the individual probabilities of the proximity sensor and the secondary sensor.

In a hypothetical example, a set of four sensors has the following probabilities of false positives, [0.3, 0.2, 0.1, 0.4], and the following probabilities for false negatives, [0.0, 0.0, 0.02, 0.03]. By conditioning sensor one's results with those of sensor two, the probability of a false positive can be reduced to: $0.3*0.2=0.06$, while maintaining probability of a false negative of 0.

By using all of the sensors with the same scheme, the sensors can be used to detect for detection. The joint probability of a false positive of sensor one and sensor two is $0.3*0.2$, or 0.06. If all sensors are considered, then the probability of a false negative becomes $1-(1-0)*(1-0)*(1-0.02)*(1-0.03)=0.0494$. The probability of false positive is $0.3*0.2*0.1*0.4=0.0024$. This probability for a false negative is likely unacceptably high for a SAR regulatory scheme.

Generally, the probability of false negative is: 1—multiplication of all detection probabilities, and the probability of false positive is: multiplication of all false alarms The availability of multiple sensors will help optimize the balance between the 2 probabilities.

FIG. 28 depicts a procedure for sensor fusion according to a first configuration of the seventh aspect of the disclosure. In this figure, and upon any relevant system/platform change, the N sensors may be ordered according to the probability of a false negative, from lowest to highest 2802. The following vectors may then be updated for selection of the fusion scheme: (1) the order of sensors indices: [Sensor_id_1, Sensor_id_2, . . . , Sensor_id_N]; (2) the false negative vector=[p_md_1, p_md_2, . . . , p_md_N]; and (3) the false positive vector=[p_fa_1, p_fa_2, . . . , p_fa_N].

According to the second configuration of the eighth aspect of the disclosure, multiple independent body proximity sensors can be used to minimize the latency and network disconnection periods due to proximity sensor activity. The availability of additional sensors that are excessively sensitive, allows for a compromise on false positives when justified per scenario. In this case, the processor for detecting human body proximity may rely on other sensors/inputs and reduce the number of measurements. If other sensors can reliably indicate no body proximity, the sensing of body proximity using a proximity sensor can be avoided. For example, if a non-proximity sensor states that the device is connected to a docking station, then the proximity sensor need not attempt to detect a human body part in close proximity to an antenna, as a human is very unlikely to place a body part within a close proximity to an antenna when the computing devices docked. The detection activity can thus be avoided if another sensor indicates that the device is docked.

FIG. 29 depicts a process flow for selection of an averaging and fusion scheme. In a first step 2902, the averaging scheme M of the Wi-Fi-based BPS, 1<=m<=M is considered.

Upon relevant system/platform changes, the end sensors are ordered according to the false-negative detection probabilities, from lowest to highest; and the following vectors are updated: order_of_sensors indices: [Sensor_id_1, Sensor_id_2, . . . , Sensor_id_N]; false_negative_vector=[p_fn_1, p_fn_2, . . . , p_fn_N]; and false_alarm_vector=[p_fp_1, p_fp_2, . . . , p_fp_N] 2904. Thereafter, alternative overall false-negative detection and false positive combinations are generated 2906. In this manner, the alternative n=Sensor_id_1, Sensor_id_2, . . . , Sensor_id_k, 1<=n<=N; false_negative_probability[n]=1-multiplication of (1-p_fn_i) for all 1<=i<=n, and the false_positive_probability[n]= multiplication of p_fp_i for all 1<=i<=n. A fusion for averaging m is selected 2908. The best combination of false_negative_probability and false_positive_probability is selected. As such, false_negative_probability_vector[m]= Selected false_negative_probability, false_positive_probability_vector[m]=Selected false_positive_probability, and fusion_vector[m]=Selected index of fusion allowing best combination. Finally, the fusion and probabilities over the entire set of M averaging alternatives are selected 2910. The best combination k over M averaging configuration is selected with Final_false_negative_probability=false_negative_probability_vector[k], Final_false_positive_probability= false_positive_probability_vector[k], and Final_fusion=Fusion_vector[k].

In a third configuration according to the eighth aspect of the disclosure, such sensors can be used as platform orientation and UWB sensors during system operation to reliably identify platform states that are known to be without body proximity and trigger capturing of the proximity sensor parameters. It is acceptable to use such sensors, even if they are not optimized for the system performance, due to increased probability of false alarms vs. the sensor they will trigger.

At this juncture, a list of potential sensors along with their sensor data, relevant antennas, and fusing implications will be discussed.

First, a Wi-Fi-based proximity sensor may indicate human tissue closer than a target distance from the Wi-Fi antennas. There must be a separate sensing for each antenna.

The solution could enable using this identification only if sufficient period elapsed from the last generation of reference BPS parameter. A processor measures voltage standing wave ratio or return loss is measured based on the Wi-Fi transmissions. These are expected to be impacted by the voltage standing wave ratio or return loss at the antenna. This is based on changes in the antenna voltage standing wave ratio or complex return loss and/or the transmission path's distortion coefficients. This may be performed on each antenna relevant to a particular sensor. This may be fused during a periodic Wi-Fi network disconnection for a number of milliseconds. For UWB or a Radiohead sensor, this may be waived with increased false positives or may help reduce false positives.

This may be utilized with an integrated sensor hub for platform orientation. In this manner, the angle of the screen or lid relative to the base is reflected in the sensor data.

Using the Hall effect, the sensors indicate the angle of the lid based on a magnetic effect. The data reflect the stability of the platform's location and may be utilized with an accelerometer or gyrometer. This may be performed with all antennas in the platform and may help reduce false positives.

This may also be performed using Wi-Fi sensing of a dynamic environment. In this manner, the sensor senses changes in a channel between two station antennas.

This may also be performed utilizing UWB, which may operate at approximately 8 GHz and operates with a limited sensing range but without loading the Wi-Fi system. This may be fused with a Wi-Fi-based proximity sensor, which would be expected to reduce false positives. Alternatively, it may be utilized alone, but would be expected to render at least some false positives.

Alternatively this may be used with a WWAN SAR sensor, which may be configured to operate in a millimeter wave and sub-6 bands. In the sub-6 band, there is functionally one sensor for each antenna, and to sensors can operate concurrently. In the millimeter wave band, there is functionally one sensor per antenna, but the operation is mutually exclusive. This may be combined with a Wi-Fi proximity sensor, which may help to reduce false positives.

Alternatively this may be combined with a WWAN BPS. Human tissue may be closer than the target distance from Wi-Fi antennas separately. The sensor may be utilized with near antenna capacitive sensors which may be connected to a Radiohead.

Alternatively, a Bluetooth based return loss estimation sensor may be utilized. In this manner, the device measures the voltage standing wave ratio or return loss in a Bluetooth design based on Bluetooth transmissions. It may be possible to have independent Bluetooth based body parts sensors based on changes in Bluetooth measured voltage standing wave ratio or return loss versus the value at free space. Based in changes in the antenna voltage standing wave ratio or complex return loss and/or the transmission path's distortion coefficients, the sensor data may be obtained. This adds diversity to the return loss estimations and the sensing decision while allowing balance of sensing activities between Wi-Fi and Bluetooth.

FIG. 30 depicts a computing device 3000 according to a configuration of the eighth aspect of the disclosure. The computing device may include a first sensor 3002, configured to detect the presence of a human body part in a vicinity and to generate a first sensor signal representing the detected presence of the human body part; a second sensor 3004, configured to detect the presence of the human body part within the vicinity; and to generate a second sensor signal representing the detected presence of the human body part; and 3006 a processor; wherein, if the first sensor signal and the second sensor signal indicate a detected presence of a human body part in the vicinity, the processor 3006 is configured to operate according to a first operational mode; and wherein, if either the first sensor signal or the second sensor signal indicates no detected presence of a human body part in the vicinity, the processor 3006 is configured to operate according to a second operational mode. In an optional configuration, the first sensor 3002 may be a capacitive or inductive proximity sensor. The second sensor 3004 may not be a capacitive or inductive proximity sensor but instead may be based on received radio frequency signals. In this manner the second sensor 3004 may include a baseband modem 3008, which may be configured to detect the presence of a human body by detecting reflected radiofrequency signals from the human body part.

In an optional configuration, the computing device 3000 may be configured such that the first sensor 3002 has a first probability of false positive results; wherein the second sensor 3004 has second probability of false positive results; and wherein the probably of a false positive result of both the first sensor 3002 and the second sensor 3004 is lower than either the first probability or the second probability.

In another optional configuration, and optionally in conjunction with any other configuration in the above two paragraphs, operating according to the first operational mode may include reducing an amount of energy emitted from an antenna in a vicinity to the detected human body part. Similarly, operating according to the second operational mode may include not reducing an amount of energy emitted from an antenna in a vicinity to the detected human body part. In this manner, wherein operating according to the second operational mode may include transmitting from an antenna in a vicinity to the detected human body part at full power.

FIG. 31 depicts another computing device 3100 according to the eighth aspect of the disclosure. The computing device includes a first sensor 3102, configured to detect a human body part in a vicinity; a second sensor 3104, configured to generate a second sensor signal representing the detected state; and a processor 3106, configured to control the first sensor to operate in either a first operational mode or a second operational mode based on the second sensor signal.

The second sensor 3102 may be configured to detect an orientation of a screen of the computing device relative to another portion of the computing device. The processor 3106 may be configured to control the first sensor to operate according to the first operational mode when the second sensor detects that the screen is open relative to a keyboard. The processor may be configured to control the first sensor to operate according to the second operational mode when the second sensor detects that the screen is closed relative to a keyboard.

The second sensor 3104 may be configured to detect whether the computing device 3100 is connected to a docking station. In this manner, the processor 3106 may be configured to control the first sensor 3102 to operate according to the first operational mode when the second sensor 3104 detects that the computing device 3100 is connected via the docking station. The processor 3106 may be configured to control the first sensor 3102 to operate according to the second operational mode when the second sensor 3104 detects no connection between the computing device 3100 and a docking station.

The first sensor 3102 operating according to the first operational mode may include the first sensor 3102 discontinuing detection of the human body part in a vicinity. Alternatively or additionally, the first sensor 3102 operating according to the second operational mode may include the first sensor 3102 operating to detect the human body part in the vicinity.

The first sensor 3102 operating according to the first operational mode may include the first sensor 3102 detecting the human body part in the vicinity according to a first detection schedule. The first sensor 3102 operating according to the second operational mode may include the first sensor 3102 detecting the human body part in the vicinity according to a second detection schedule. In this manner, the first detection schedule may be less frequent than the second detection schedule.

The second sensor 3104 may include a baseband modem 3108 and may be configured to detect a human body part based on reflection of a radiofrequency signal from the human body part to an antenna connected to the baseband modem 3108.

FIG. 32 depicts a computing device 3200, including a first sensor 3202, configured to detect whether a human body part is present in a vicinity and to generate first sensor data representing the detection of whether the human body part is present in the vicinity; a second sensor 3204, configured to detect a state of the computing device and to generate a second sensor data representing the detected state; and a processor 3206, wherein, during a first time instance in which the second sensor 3204 detects the state of the computing device, the processor 3206 is configured to store in a memory the first sensor data of the first time instance; wherein the processor 3206 is configured to operate according to a first operational mode if a difference between first sensor data of a second time instance and the stored first sensor data of the first time instance is outside of a range; wherein the processor 3206 is configured to operate according to a second operational mode if a difference between first sensor data of a second time instance and the stored first sensor data of the first time instance is within the range.

The processor 3206 operating according to the first operational mode may include the processor 3206 controlling a circuit to reduce energy emitted from an antenna in a vicinity of the first sensor. The processor 3206 operating according to the second operational mode may include the processor 3206 controlling a circuit (e.g. a baseband modem, a transmit power manager) to transmit from the antenna in the vicinity of the first sensor at full power.

The processor 3206 operating according to the second operational mode may include the processor 3206 not controlling the circuit to reduce energy emitted from an antenna in a vicinity of the first sensor.

The first sensor 3202 may be a capacitive or inductive proximity sensor. The second sensor 3204 may instead be configured to detect a human body part based on radiofrequency signals reflected from the human body part. The second sensor 2306 may include a baseband modem 3206, configured to detect a proximity of a human body part based on a reflection of a radiofrequency signal from the human body part. The second sensor 3204 may be configured to detect a position of a lid or a screen of the computing device relative to another portion of the computing device.

Many computing devices already have various sensors for sensing a variety of states or contexts that are at least not directly related to proximity of a human body part. These may include, but are not limited to sensors as platform orientation and UWB. Although these sensors do not directly sense the presence of a human body part in close proximity to an antenna, they may provide information that can be understood as a proxy (e.g. a substitute for) information about a proximity of a human body part. That is, these sensors can often detect states which would exclude or at least make very unlikely the presence of a human body part in close proximity to an antenna.

For the purposes of this aspect of the disclosure, these additional sensors whose data may be understood as a proxy for proximity of a human body part may be understood as secondary sensors. A list of possible secondary sensors and their relevant attributes is provided above.

In light of this, it may be acceptable to use secondary sensors for body part detection, or at least exclusion of body parts in close proximity to an antenna, even if the secondary sensors are not optimized for detection of a human body part.

In this manner, a baseband modem (e.g. whether for transmission in a WWAN or WLAN network) may be used to detect the proximity of the human body part in close proximity to an antenna based on reflection of radiofrequency signals from the human body part. Similarly, a Bluetooth receiver may be used for this purpose. Additionally or alternatively, sensors regarding whether a computing device is open or closed (e.g. whether the lid is open or closed) may serve as a proxy for the presence of a human body part. That is, if the lid is closed, the screen may be no longer visible, and it may therefore be assumed that the device is not being operated by a human user. As an extension of this, when the screen is dark or in standby mode, it may also be assumed that the device is not operated by a human user. Additionally or alternatively, accelerometer data may be used as a proxy for the presence of a human user. That is, when a device is placed on a human lap, and accelerometer is sensitive enough to detect even small movements associated with the human user, whereas when the device is placed on a table or other stable surface, the accelerometer will not generally detect such movements, and it can be assumed that the device is not resting on a human lap.

In one configuration, and given the probability of a false positive result from a proximity sensor (e.g. a capacitive or inductive proximity sensor), a positive detection of a human body part within close proximity to a proximity sensor may be cross-referenced with sensor information from any of the sensors described above. The absence of a detection of a human body part in close proximity to the device by any of the sensors described in these paragraphs may indicate the presence of a false positive detection by the proximity sensor.

Additionally or alternatively, the proximity sensor may be switched off or placed in a standby mode during periods in which any of the sensors described above do not detect a human body part within close proximity to the computing device or detect no human body part in close proximity to the computing device. In this manner, the capacitive or inductive proximity sensors may not provide sensor data to a controller or processor for SAR compliance during periods in which other sensors detect no human being in close proximity to the device. In this manner, sensor data traffic may be reduced, thereby reducing data congestion and battery consumption.

Additionally or alternatively, and should a proximity sensor be placed in standby mode or otherwise switched off, a processor may switch on the proximity sensor, place the proximity sensor in an active mode, or otherwise begin processing sensor data from the proximity sensor following a predetermined duration after a last detection from a secondary sensor that a human being is not in close proximity to the device.

Wireless communication of a computing device (e.g. a user device, a laptop, a tablet computer, etc.) may be improved with changes in device orientation relative to the access point or base station. According to this ninth aspect of the disclosure, a computing device may direct a user to change the computing device's orientation (e.g. swivel left or right, etc.) or screen orientation (change angle of screen) to obtain an improved signal.

The computing device may be configured to detect any of a plurality of indicators of wireless performance. These may be or include RSSI and data rate/throughout. As a general concept, a low data rate may indicate a problem of device orientation. A low data rate coupled with a strong signal (e.g. a strong RSSI) may be further indicative of suboptimal device orientation.

FIG. 33 depicts a wireless access point 3302 (e.g. a wireless base station, a Wi-Fi modem, etc.) and a user computing device 3304, which is depicted as a laptop for demonstrative purposes but may include any of a laptop, a tablet computer, a smart phone, a wearable device or other computing device capable of simultaneous or concurrent use of at least two antennas for wireless communication. Although the wireless access point 3302 may generally be expected to remain stationary, the user computing device 3304 may be free to change orientation relative to the wireless access point 3302, such as by changing its location, (e.g. moving to a new place in the room), its position (turning or swiveling) it's antenna angle (e.g. an angle of opening of the lid and/or a tilt of the device), or any of these.

Computing device may be configured to implement an orientation correction process, in which a user is prompted to make one or more changes in the device's orientation, and the user is instructed when an improved orientation is achieved. The orientation correction procedure may be triggered by detection of a suboptimal orientation. In this manner, the device may detect a reduced or lower-than-expected throughput and initiate the orientation correction procedure as a means to improve the throughput. In an optional configuration, the device may detect reduced or lower-than-expected throughput based on a combination of strong signal strength (e.g. RSSI) and low throughput. Alternatively or additionally, the orientation correction procedure may be triggered by user request. At any time during usage, a user (e.g. a user who is dissatisfied with the quality of experience) may initiate an orientation correction procedure. Alternatively or additionally, the orientation correction procedure may be triggered based on an elapsed duration from the last orientation correction procedure. In this manner, the computing device may be configured to perform the orientation correction procedure periodically to ensure correct orientation. The period for the orientation correction procedure may be any duration without limitation. In an optional configuration, the period for the orientation correction procedure may be every five minutes, every ten minutes, every fifteen minutes, every half hour, every hour, or otherwise. Alternatively or additionally, the orientation correction procedure may be triggered by an ambient temperature change. The channel for the radiofrequency signal depends at least in part on the ambient temperature, and significant changes in temperature may result in sufficient change to the channel that a previously acceptable orientation has become undesirable. Accordingly, the orientation correction procedure may begin upon determination that an ambient temperature has changed beyond a predetermined threshold. Alternatively or additionally, the orientation correction procedure may be triggered when the computing device encounters significant movement, followed by a period of no movement. The significant movement may indicate a change in orientation, resulting in the device coming to rest in an orientation that is untested and potentially suboptimal.

The orientation correction procedure may include the computing device issuing a request for a user to change the computing device's orientation relative to an access point. This may include a change in orientation of the device itself, such as turning the device, swiveling the device, or moving the device to another location. Alternatively or additionally, the orientation correction procedure may include a change in the lid's (e.g. the monitor's) orientation, such as an angle of opening relative to the keyboard. It is noted that any such change in angle of opening relative to the keyboard will also result in a change of orientation relative to the access point.

The request for the user to change the computing device's orientation may be in any form without limitation. In one configuration, the user may receive a text based request, such as in the computing device's screen. Alternatively or additionally, the request may be a visual request, such as a request based on icons, pictographs, or otherwise. Alternatively or additionally, the request may be an auditory request, such as with spoken words, music, signal tones, or otherwise. Alternatively or additionally, the request may be a visual request such as the illumination of a light. Alternatively or additionally, the request may be a haptic request, such as a vibration.

Upon a change in orientation of the computing device, the wireless channel quality may be measured. Measurement of the wireless channel quality may include, but not be limited to, current receive rate, current transmit rate, beacon RSSI and signal-to-noise ratio (SNR), receive channel estimation over current network data messages (RSSI, MSC, SNR), transmit channel estimation data based on feedback to transmit sounding messages, receive channel estimation data based on received sounding messages, or any of these.

The computing device may optionally be configured to report a result of the measurements following the change in orientation. In this manner, the user may receive feedback as to whether the change in orientation has improved throughput, detriment in throughput, or been neutral relative to throughput. This feedback may be provided to the user via an on-screen message or image, sound, lights or other visual cues, or a haptic response.

Alternatively or additionally, the principles and methods described herein with respect to optimization of device orientation may be applied to optimization of access point antennas. In a Wi-Fi configuration, a wireless access point may include multiple antennas, and these antennas may be configured to be adjusted by a user. The orientation optimization principles described herein may be applied to the antennas of an access point, such that a user is prompted to change orientation of one or more antennas of the access point, and the user receives feedback (e.g. such as on the user's computer) regarding a result in the change of position of the antennas. This may be carried out by software installed on the user's computing device, which may be configured to measure signal strength and/or throughput as described herein above following a change in orientation of the access point's antennas, and to report the results of this change in orientation to the user via the user's computing device.

FIG. 34 depicts a computing device 3400 according to an aspect of this disclosure. In this figure, the computing device 3400 includes an interface 3402 to a radiofrequency circuit; a processor 3404 coupled to the interface and configured to determine from data received from the interface a first indicator; if the first indicator satisfies a first condition, control a circuit to generate a user alert to change an orientation of the computing device. The processor 3404 may be configured to determine a second indicator from the data received from the interface 3402. The processor 3404 may be configured to control the circuit to generate a user alert to change the orientation of the computing device only if both the first indicator and the second indicator satisfy a second condition. In this manner, the first indicator may be a data rate of a signal received at an antenna connected to the interface, and the first condition may be a data rate below a second threshold. The second indicator may be a signal strength of a signal received at an antenna connected to the interface, and the second condition may be a signal strength above a first threshold.

The user alert may include any of a text alert displayed on a screen of the computing device; an image displayed on the screen of the computing device; an auditory alert; a haptic alert, or any of these.

The computing device may optionally include an artificial neural network 3406, which may be configured to receive data from the interface. In this manner, determining whether the first indicator satisfies a first condition and the second indicator satisfies a second condition may include determining whether the first indicator satisfies a first condition and the second indicator satisfies a second condition using the artificial neural network. The artificial neural network may be stored on a storage medium within the computing device or may optionally be stored on a storage medium remote from the device, such as in a server, a cloud server, etc.

The processor 3404 may be further configured to control the circuit to generate the user alert to change an orientation of the computing device periodically. The processor 3404 may be further configured to control the circuit to generate the user alert to change an orientation of the computing device at user request. The processor 3404 may be further configured to control the circuit to generate the user alert to change an orientation of the computing device following a period in which the computing device is stationary.

Alternatively or additionally, the computing device may include 3402 an interface to a radiofrequency circuit; and a processor 3404 coupled to the interface and configured to determine from data received from the interface a first indicator if the first indicator satisfies a first condition, control a circuit to generate a user alert to change an orientation of one or more antennas of a wireless access point. The processor 3404 may be configured to determine a second indicator from the data received from the interface. The processor may be configured to control the circuit to generate a user alert to change the orientation of the one or more antennas of the wireless access point only if both the first indicator and the second indicator satisfy a second condition.

The processor may be further configured to control the circuit to generate the user alert to change an orientation of the one or more antennas of the wireless access point periodically. The processor may be further configured to control the circuit to generate the user alert to change an orientation of the one or more antennas of the wireless access point at user request.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A computing device, comprising:
a first housing portion, comprising a first antenna;
a second housing portion, comprising a second antenna;
a moveable joint, configured to permit the first housing portion to move relative to the second housing portion;
one or more processors, configured to determine a signal characteristic of a wireless signal sent from the first antenna of the first housing portion and received on the second antenna of the second housing portion;
a first sensor, configured to detect a presence of a human body part in a first vicinity of the first antenna and to generate a first sensor signal representing the detected presence of the human body part if the signal characteristic is outside of a predefined signal range; and
a second sensor, configured to detect the presence of the human body part within a second vicinity of the first antenna, and to generate a second sensor signal representing the detected presence of the human body part;
wherein the first sensor has a first probability of false positive results; wherein the second sensor has second probability of false positive results; and wherein a combined probability of a false positive result of both the first sensor and the second sensor is lower than either the first probability or the second probability; and
wherein the one or more processors are configured to reduce a total maximum transmit power of the first antenna if the combined probability is outside of a predefined probability range.

2. The computing device of claim 1, wherein the signal characteristic is a received signal strength of the wireless signal.

3. The computing device of claim 1, wherein the one or more processors are further configured to determine whether to reduce a maximum transmit power on the first antenna and/or on the second antenna based on the signal characteristic.

4. The computing device of claim 1, wherein if the signal characteristic is outside of a range, the one or more processors are further configured to reduce a maximum transmit power on the first antenna and/or on the second antenna.

5. The computing device of claim 1, wherein if the signal characteristic is outside of the predefined signal range, the one or more processors are further configured to reduce a total maximum transmit power on the first antenna and on the second antenna beneath a threshold; and wherein if the signal characteristic is within the predefined signal range, the one or more processors are further configured to permit the total maximum transmit power on the first antenna and on the second antenna to be above the threshold.

6. The computing device of claim 1, wherein the one or more processors are further configured to determine a distance between the first antenna and the second antenna based on the signal characteristic.

7. The computing device of claim 1, wherein the one or more processors are further configured to determine an angle of the first housing portion relative to the second housing portion at the moveable joint based on the signal characteristic.

8. A computing device comprising:
a first antenna;
a second antenna;
a memory, configured to store a first signal parameter corresponding to the first antenna and a second signal parameter corresponding to the second antenna;
a first proximity sensor, configured to detect a proximity of a human body part near the first antenna and to generate proximity sensor data representing the detected proximity of the human body part;
a second proximity sensor, configured to detect the proximity of the human body part near the second antenna and to generate second proximity sensor data representing the detected proximity of the human body part; and
a processor, wherein if the proximity sensor data is outside of a range, the processor is configured to determine a third signal parameter corresponding to the first antenna, and if the second signal parameter is greater than the third signal parameter, the processor is configured to control a baseband modem to send a wireless signal over the second antenna,
wherein the first proximity sensor has a first probability of false positive results; wherein the second proximity sensor has second probability of false positive results; and wherein a combined probability of a false positive result of both the first proximity sensor and the second proximity sensor is lower than either the first probability or the second probability.

9. The computing device of claim 8, wherein the processor determining the third signal parameter comprises the processor determining the third signal parameter based on the first signal parameter and the proximity sensor data.

10. The computing device of claim 9, wherein the processor determining the third signal parameter based on the first signal parameter and the proximity sensor data comprises the processor determining the third signal parameter based on the first signal parameter and the proximity sensor data from a look up table.

11. The computing device of claim 8, wherein if the proximity sensor data is outside of the range, and if the third signal parameter is less than the second signal parameter, the processor is configured to control the baseband modem to send the wireless signal over the second antenna before performing a network scan for a radio access technology corresponding to the second antenna.

12. The computing device of claim 8, wherein if the proximity sensor data is outside of the range, and if the third signal parameter is less than the second signal parameter, the processor is configured to control the baseband modem to send the wireless signal over the second antenna before performing an additional quality of service calculation for the second antenna.

13. The computing device of claim 8, wherein each of the first signal parameter, the second signal parameter, and the third signal parameter is a quality of service value or a value representing a quality of service value.

14. The computing device of claim 8, wherein if the proximity sensor data is outside of the range, and the third signal parameter is greater than the second signal parameter, the processor is configured to control a baseband modem to send the wireless signal over the first antenna,
wherein the first antenna is configured to send or receive a wireless signal according to a wireless local area network protocol and the second antenna is configured to send or receive a wireless signal according to a wireless wide area network protocol; or wherein the first antenna is configured to send or receive a wireless signal according to a wireless wide area network protocol and the second antenna is configured to send or receive a wireless signal according to a wireless local area network protocol.

15. A computing device, comprising:

an interface to a radiofrequency circuit;

a first proximity sensor configured to detect a first proximity of a body part to the radiofrequency circuit;

a second proximity sensor configured to detect a second proximity of a body part to the radiofrequency circuit;

wherein the first proximity sensor has a first probability of false positive results; wherein the second proximity sensor has second probability of false positive results; and wherein a combined probability of a false positive result of both the first proximity sensor and the second proximity sensor is lower than either the first probability or the second probability; and a processor coupled to the interface and configured to:

determine from data received from the interface a first indicator;

if the first indicator satisfies a first condition, control a circuit to generate a user alert to change an orientation of the computing device based on the combined probability.

16. The computing device of claim 15, wherein the processor is configured to determine a second indicator from the data received from the interface; and wherein the processor is configured to control the circuit to generate a user alert to change the orientation of the computing device only if both the first indicator and the second indicator satisfy a second condition.

17. The computing device of claim 16, wherein the first indicator is a signal strength of a signal received at an antenna connected to the interface, and the first condition is a signal strength above a first threshold; and wherein the second indicator is a data rate of a signal received at an antenna connected to the interface, and the second condition is a data rate below a second threshold.

18. The computing device of claim 15, wherein the user alert comprises any of a text alert displayed on a screen of the computing device; an image displayed on the screen of the computing device; an auditory alert; a haptic alert, or any of these.

19. The computing device of claim 16, further comprising an artificial neural network, configured to receive data from the interface; wherein determining whether the first indicator satisfies a first condition and the second indicator satisfies a second condition comprises determining whether the first indicator satisfies the first condition and the second indicator satisfies the second condition using the artificial neural network.

20. The computing device of claim 15, wherein the processor is further configured to control the circuit to generate the user alert to change an orientation of the computing device periodically.

21. A computing device comprising:

a first antenna;

a second antenna;

a memory, configured to store a first signal parameter corresponding to the first antenna and a second signal parameter corresponding to the second antenna;

a first proximity sensor, configured to detect a proximity of a human body part near the first antenna and to generate proximity sensor data representing the proximity of the human body part; and a processor, wherein if the proximity sensor data is outside of a range, the processor is configured to determine a third signal parameter corresponding to the first antenna, and if the second signal parameter is greater than the third signal parameter, the processor is configured to transmit a wireless signal over the second antenna, wherein if the proximity sensor data is outside of the range, and if the third signal parameter is less than the second signal parameter, the processor is configured to transmit the wireless signal over the second antenna before performing a network scan for a radio access technology corresponding to the second antenna or before performing an additional quality of service calculation for the second antenna.

22. The computing device of claim 21, wherein the processor determining the third signal parameter comprises the processor determining the third signal parameter based on the first signal parameter and the proximity sensor data.

23. The computing device of claim 22, wherein the processor determining the third signal parameter based on the first signal parameter and the proximity sensor data comprises the processor determining the third signal parameter based on the first signal parameter and the proximity sensor data from a look up table.

24. The computing device of claim 21, wherein each of the first signal parameter, the second signal parameter, and the third signal parameter is a quality of service value or a value representing a quality of service value.

* * * * *